United States Patent [19]

Hafner et al.

[11] Patent Number: 5,776,997
[45] Date of Patent: Jul. 7, 1998

[54] PROCESS FOR POLYMERIZING CYCLICAL OLEFINS AND PHOTOPOLYMERIZABLE COMPOSITION

[75] Inventors: Andreas Hafner, Laupen; Andreas Mühlebach, Belfaux; Paul Adriaan Van Der Schaaf, Fribourg, all of Switzerland

[73] Assignee: Ciba Specialty Chemicals Corporation, Tarrytown, N.Y.

[21] Appl. No.: 817,624

[22] PCT Filed: Nov. 6, 1996

[86] PCT No.: PCT/EP95/04364

§ 371 Date: May 22, 1997

§ 102(e) Date: May 22, 1997

[87] PCT Pub. No.: WO96/16105

PCT Pub. Date: May 30, 1996

[30] Foreign Application Priority Data

Nov. 17, 1994 [CH] Switzerland ............... 3460/94

[51] Int. Cl.[6] ............... C08G 61/08; C08F 2/50
[52] U.S. Cl. ............... 522/65; 522/66; 522/28; 522/29; 522/184; 522/185; 522/186; 522/188
[58] Field of Search ............... 522/65, 66, 67, 522/28, 29, 184, 186, 188, 185

[56] References Cited

U.S. PATENT DOCUMENTS

| | | | |
|---|---|---|---|
| 3,997,417 | 12/1976 | Marek et al. | 522/66 |
| 4,963,470 | 10/1990 | Klingert et al. | 522/66 |
| 5,223,467 | 6/1993 | Razaui | 502/152 |
| 5,594,081 | 1/1997 | Uchino et al. | 526/127 |
| 5,596,054 | 1/1997 | Takeuchi | 526/134 |
| 5,623,034 | 4/1997 | Aoyama et al. | 526/160 |

*Primary Examiner*—Susan W. Berman
*Attorney, Agent, or Firm*—Luther A. R. Hall

[57] ABSTRACT

Process for the photocatalytic polymerization of a cyclical olefin or at least two different cyclical olefins in the presence of a metal compound as the catalyst, in which a photochemical ring-opening metathesis polymerization is carried out in the presence of a catalytic amount of at least one heat-stable titanium(IV), niobium(V), tantalum(V), molybdenum(VI) or tungsten(VI) compound in which a silylmethyl group and at least one halogen are bonded to the metal. The process can also be carried out by first performing the irradiation and ending the polymerization by heating.

The process is suitable, for example, for the production of thermoplastic shaping compounds, coatings and images in relief.

30 Claims, No Drawings

PROCESS FOR POLYMERIZING CYCLICAL OLEFINS AND PHOTOPOLYMERIZABLE COMPOSITION

The present invention relates to a process for the polymerization of cyclical olefins by photochemical ring-opening metathesis polymerization using catalytic amounts of a molybdenum, tungsten, titanium, niobium or tantalum catalyst in which a silylmethyl group and at least one halogen are bonded to the metal, and to compositions comprising these olefins together with a catalytic amount of this catalyst.

Thermally induced ring-opening metathesis polymerization using catalytic amounts of metal catalysts has already been known for a relatively long time and is described in many cases in the literature [cf., for example, Ivin, K. J., Olefin Metathesis 1–12, Academic Press, London (1983)]. Polymers which can be prepared in this way are prepared industrially and are commercially obtainable. On the other hand, only little has become known on photochemically induced ring-opening metathesis polymerization and as yet there have been no commercial applications.

It is known from U.S. Pat. No. 4,060,468 to carry out an olefin metathesis polymerization by introducing a two-component mixture of a metal salt chosen from salts of tungsten, molybdenum, rhenium and tantalum and a substituted phenol or benzyl alcohol as cocatalysts into a reaction vessel with the monomeric olefin and then irradiating the entire reaction mixture with UV light. Only cyclical and acyclical hydrocarbons without functional groups or substituents are mentioned as olefins. Separate storage of the catalyst components and the process step of mixing the catalyst components directly before the actual reaction make the known process industrially expensive and cumbersome.

Tanielan et al. [Tanielan, C., Kieffer, R., Harfouch, A., Tetrahedron Letters 52:4589–4592 (1977)] describe the catalyst system $W(CO)_6/CCl_4$, which, after irradiation with UV light, can be employed for metathesis polymerization of cyclopentene and norbornene. Metal carbonyls are volatile and toxic, so that their use necessitates expensive safety precautions for physiological reasons. Furthermore, a free-radical addition reaction with formation of monomeric 1-chloro-2-trichloromethyl-cycloalkanes is observed as a competing reaction.

It is known from Thoi et al. [Thoi, H. H., Ivin, K. J., Rooney, J. J., J. Mol. Catal. 15:245–270 (1982)] that a tungsten pentacarbonyl-carbene complex of the formula

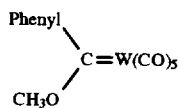

is a thermal catalyst for ring-opening metathesis polymerization of dimethylnorbornene and, together with phenylacetylene as a cocatalyst, is also a photocatalyst system for the same polymerization. This catalyst system has the serious disadvantage that, as a ready-to-use formulation, it has only a low storage stability, the carbonyl compound is physiologically unacceptable and the tolerance towards functional groups in cycloolefins is too low.

Feldman et al. [Feldman, C., et al., in: Stephen J. Lippard (Ed.) Progress in Inorganic Chemistry 39:3–73 (1991)] describe molybdenum- and tungsten-alkylidene complexes which by themselves are only weak but together with Lewis acids are active thermal catalysts for the polymerization of cycloolefins.

The known catalysts which can be activated photochemically thus always require a cocatalyst, which means that the quality of the polymers prepared can vary greatly as a result of the chosen nature and sequence of the reagents.

Polymers of cyclical olefins can be prepared by photochemical ring-opening metathesis polymerization by the known processes only with a high expenditure and in an economically unsatisfactory manner. The lack of storage stability, which allows mixing of the components only directly before the preparation, the lack of tolerance towards functionalized cyclical olefins and the need to use two components as the catalyst system are found to be particular disadvantages. There is therefore a need to provide a generally usable process, which is improved from industrial, economic and ecological aspects, for the preparation of polymers from cyclical olefins by photochemical ring-opening metathesis polymerization.

WO 93/13171 describes air- and water-stable one-component and two-component catalysts based on molybdenum compounds and tungsten compounds containing carbonyl groups and ruthenium compounds and osmium compounds with at least one polyene ligand for the thermal metathesis polymerization and a photoactivated metathesis polymerization of tight cycloolefins, in particular norbornene and norbornene derivatives. No other polycyclical—above all non-fused polycyclical, cycloolefins are mentioned. The one-component catalysts of the ruthenium compounds used, that is to say $[(C_6H_6)Ru(CH_3CN)_2Cl]^+PF_6^-$ and $[Ru(cumene)Cl_2]_2$, can indeed be activated by UV irradiation; however, the storage stability of the compositions with norbornene is completely inadequate. These catalysts are capable of replacing the known two-component catalysts only inadequately.

Petasis and Fu [Petasis, N. A., Fu, D., J. Am. Chem. Soc. 115:7208–7214 (1993)] describe thermal ring-opening metathesis polymerization of norbornene using biscyclopentadienyl-bis(trimethylsilyl)methyl-titanium(IV) as the thermally active catalyst. However, the activity of the catalyst is low, which means that long reaction times are required and furthermore only relatively low polymer yields are achieved. It is not reported that these catalysts are suitable for photoinduced ring-opening metathesis polymerization of tight cycloolefins.

It has been found that compositions of strained cycloolefins and a one-component catalyst can be polymerized photochemically if the composition comprises a titanium (IV), niobium(V), tantalum(V), molybdenum(VI) or tungsten(VI) compound in which at least one halogen and a silylmethyl group are bonded to the metal. These thermally stable compounds have surprisingly proved to be active catalysts for photoinduced ring-opening metathesis polymerization, the storage stability of mixtures of cycloolefins and the titanium(IV), niobium(V), tantalum(V), molybdenum(VI) or tungsten(VI) compounds being retained in spite of the photochemical reactivity.

It has furthermore been found, surprisingly, that the catalysts mentioned act as thermal catalysts after only brief irradiation in the presence of cycloolefins, so that the photochemical and thermal polymerization can be used in combination.

The present invention relates to a process for the photocatalytic polymerization of a cyclical olefin or at least two different cyclical olefins in the presence of a metal compound as the catalyst, which is characterized in that a photochemical ring-opening metathesis polymerization is carried out in the presence of a catalytic amount of at least one heat-stable titanium(IV), niobium(V), tantalum(V), molybdenum(VI) or tungsten(VI) compound in which a silylmethyl group and at least one halogen are bonded to the metal.

The other valencies of the titanium, niobium, tantalum, molybdenum and tungsten are preferably satisfied with heat-stable neutral ligands, a very large number of which are known. The number of neutral ligands can also exceed the stoichiometrically possible number (solvates).

The cyclical olefins can be monocyclical or polycyclical fused and/or bridged ring systems, for example with two to four rings, which are unsubstituted or substituted and can contain heteroatoms, for example, O, S, N or Si, in one or more rings and/or fused aromatic or heteroaromatic rings, for example o-phenylene, o-naphthylene, o-pyridinylene or o-pyrimidinylene. The individual cyclical rings can contain 3 to 16, preferably 3 to 12, and particularly preferably 3 to 8 ring members. The cyclical olefins can contain further non-aromatic double bonds, preferably 2 to 4 such additional double bonds, depending on the ring size. The ring substituents are those which are inert, i.e. which do not impair the chemical stability and heat stability of the titanium, niobium, tantalum, molybdenum and tungsten compounds. The cycloolefins are tight rings or ring systems.

Heat stability in the context of the invention means that the photocatalytically active titanium(IV), niobium(V), tantalum(V), molybdenum(VI) or tungsten(VI) compounds compounds form no active species for the ring-opening metathesis polymerization when heated. For example, at room temperature to slightly elevated temperature, for example +40° C., the catalyst cannot initiate any ring-opening metathesis polymerization within weeks with exclusion of light. During this period, only an insignificant amount of monomer (less than 0.2% by weight) is reacted. The heat stability can be determined, for example, in that a toluene solution with 20% by weight of monomer and 0.33% by weight of titanium, molybdenum, tungsten, niobium or tantalum catalyst is stored in the dark at 50° C. for 96 hours and any amount of polymer formed, which can be detected by a build-up in viscosity, can be determined quantitatively by precipitation in a precipitant, for example ethanol, filtration and drying, is not more than 0.5% by weight, and preferably not more than 0.2% by weight.

If the cyclical olefins contain more than one double bond, for example 2 to 4 double bonds, crosslinked polymers can also form, depending on the reaction conditions, the monomer chosen and the amount of catalyst.

In a preferred embodiment of the process according to the invention, the cycloolefins correspond to the formula I

  (I)

in which $Q_1$ is a radical having at least one carbon atom which, together with the —CH═CQ$_2$ group, forms an at least 3-membered alicyclical ring which optionally contains one or more heteroatoms chosen from the group consisting of silicon, phosphorus, oxygen, nitrogen and sulfur; and which is unsubstituted or substituted by halogen, ═O, —CN, —NO$_2$, $R_1R_2R_3Si$—(O)$_u$, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{20}$alkyl, $C_1$-$C_{20}$hydroxyalkyl, $C_1$-$C_{20}$haloalkyl, $C_1$-$C_6$cyanoalkyl, $C_3$-$C_8$cycloalkyl, $C_6$-$C_{16}$aryl, $C_7$-$C_{16}$aralkyl, $C_3$-$C_6$heterocycloalkyl, $C_3$-$C_{16}$heteroaryl, $C_4$-$C_{16}$heteroaralkyl or $R_4$—X—; or in which two adjacent C atoms are substituted by —CO—O—CO— or —CO—NR$_5$—CO—; or in which an alicyclical, aromatic or heteroaromatic ring which is unsubstituted or substituted by halogen, —CN, —NO$_2$, $R_6R_7R_8Si$—(O)$_u$, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{20}$alkyl, $C_1$-$C_{20}$haloalkyl, $C_1$-$C_{20}$hydroxyalkyl, $C_1$-$C_6$cyanoalkyl, $C_3$-$C_8$cycloalkyl, $C_6$-$C_{16}$aryl, $C_7$-$C_{16}$aralkyl, $C_3$-$C_6$heterocycloalkyl, $C_3$-$C_{16}$heteroaryl, $C_4$-$C_{16}$heteroaralkyl or $R_{13}$—$X_1$— is optionally fused onto adjacent carbon atoms of the alicyclical ring;

X and $X_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

$R_1$, $R_2$ and $R_3$ independently of one another are $C_1$-$C_{12}$alkyl, $C_1$-$C_{12}$perfluoroalkyl, phenyl or benzyl;

$R_4$ and $R_{13}$ independently are $C_1$-$C_{20}$alkyl, $C_1$-$C_{20}$haloalkyl, $C_1$-$C_{20}$hydroxyalkyl, $C_3$-$C_8$cycloalkyl, $C_6$-$C_{16}$aryl or $C_7$-$C_{16}$aralkyl;

$R_5$ and $R_{10}$ independently of one another are hydrogen, $C_1$-$C_{12}$alkyl, phenyl or benzyl, where the alkyl groups in turn are unsubstituted or substituted by $C_1$-$C_{12}$alkoxy or $C_3$-$C_8$cycloalkyl;

$R_6$, $R_7$ and $R_8$ independently of one another are $C_1$-$C_{12}$alkyl, $C_1$-$C_{12}$perfluoroalkyl, phenyl or benzyl;

M is an alkali metal and $M_1$ is an alkaline earth metal; and u is 0 or 1;

where the alicyclical ring formed with $Q_1$ optionally contains further non-aromatic double bonds;

$Q_2$ is hydrogen, $C_1$-$C_{20}$alkyl, $C_1$-$C_{20}$haloalkyl, $C_1$-$C_{12}$alkoxy, halogen, —CN or $R_{11}$—$X_2$—;

$R_{11}$ is $C_1$-$C_{20}$alkyl, $C_1$-$C_{20}$haloalkyl, $C_1$-$C_{20}$hydroxyalkyl, $C_3$-$C_8$cycloalkyl, $C_6$-$C_{16}$aryl or $C_7$-$C_{16}$aralkyl;

$X_2$ is —C(O)—O— or —C(O)—NR$_{12}$;

$R_{12}$ is hydrogen, $C_1$-$C_{12}$alkyl, phenyl or benzyl;

where the abovementioned cycloalkyl, heterocycloalkyl aryl, heteroaryl, aralkyl and heteroaralkyl groups are unsubstituted or substituted by $C_1$-$C_{12}$alkyl, $C_1$-$C_{12}$alkoxy, —NO$_2$, —CN or halogen, and where the heteroatoms of the abovementioned heterocycloalkyl, heteroaryl and heteroaralkyl groups are chosen from the group consisting of —O—, —S—, —NR$_9$— and —N═; and $R_9$ is hydrogen, $C_1$-$C_{12}$alkyl, phenyl or benzyl.

Fused-on alicyclical rings preferably contain 3 to 8 particularly preferably 4 to 7, and especially preferably 5 or 6 ring C atoms.

If an asymmetric center is present in the compounds of the formula I, the compounds can occur in optically isomeri forms as a result. Some compounds of the formula I ca occur in tautomeric forms (for example keto-enc tautomerism). If an aliphatic C═C double bond is presen geometric isomerism (E form or Z form) can also occu Exo-endo configurations are furthermore also possible. For mula I thus includes all the possible stereoisomers which are present in the form of enantiomers, tautomer diastereomers, E/Z isomers or mixtures thereof.

In the definitions of the substituents, the alkyl, alkenyl an alkynyl groups can be straight-chain or branched. The sam also applies to the alkyl or each alkyl moiety of alkox alkylthio, alkoxycarbonyl and further alkyl-containin groups. These alkyl groups preferably contain 1 to 12, mo preferably 1 to 8, and particularly preferably 1 to 4 C atom These alkenyl and alkynyl groups preferably contain 2 to 1 more preferably 2 to 8, and particularly preferably 2 to 4 atoms.

Alkyl includes, for example, methyl, ethyl, isoprop n-propyl, n-butyl, iso-butyl, sec-butyl, tert-butyl and tl various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, for example the isopropyl, n-propyl, n-butyl, iso-butyl, sec-butyl and tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-octadec-2-enyl and n-octadec-4-enyl.

Cycloalkyl is preferably $C_5$–$C_8$cycloalkyl, in particular $C_5$- or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methylnitrile), cyanoethyl (ethylnitrile), 1-cyanoisopropyl, 1-cyano-n-propyl, 2-cyano-n-butyl, 1-cyano-iso-butyl, 1-cyano-sec-butyl, 1-cyano-tert-butyl and the various isomeric cyanopentyl and -hexyl radicals.

Aralkyl preferably contains 7 to 12 C atoms, and particularly preferably 7 to 10 C atoms. It can be, for example, benzyl, phenethyl, 3-phenylpropyl, α-methylbenzyl, phenbutyl or α,α-dimethylbenzyl.

Aryl preferably contains 6 to 10 C atoms. It can be, for example, phenyl, pentalene, indene, naphthalene, azulene or anthracene.

Heteroary preferably contains 4 or 5 C atoms and one or two heteroatoms from the group consisting of O, S and N. It can be, for example, pyrrole, furan, thiophene, oxazole, thiazole, pyridine, pyrazine, pyrimidine, pyridazine, indole, purine or quinoline.

Heterocycloalkyl preferably contains 4 or 5 C atoms and one or two heteroatoms from the group consisting of O, S and N. It can be, for example, oxirane, azirine, 1,2-oxathiolane, pyrazoline, pyrrolidine, piperidine, piperazine, morpholine, tetrahydroturan or tetrahydrothiophene.

Alkoxy is, for example, methoxy, ethoxy, propyloxy, i-propyloxy, n-butyloxy, i-butyloxy, sec-butyloxy and t-butyloxy.

Alkali metal in the context of the present invention is to be understood as meaning lithium, sodium, potassium, rubidium and cesium, in particular lithium, sodium and potassium.

Alkaline earth metal in the context of the present invention is to be understood as meaning beryllium, magnesium, calcium, strontium and barium, in particular magnesium and calcium.

In the above definition, halogen is to be understood as meaning fluorine, chlorine, bromine and iodine, preferably fluorine, chlorine and bromine.

Compounds of the formula I which are particularly suitable for the process according to the invention are those in which $Q_2$ is hydrogen.

Compounds of the formula I which are furthermore preferred for the polymerization are those in which the alicyclical ring which $Q_1$ forms together with the —CH=CQ$_2$— group has 3 to 16, more preferably 3 to 12, and particularly preferably 3 to 8 ring atoms, where the ring system can be monocyclical, bicyclical, tricyclical or tetracyclical.

The process according to the invention can be carried out particularly advantageously with those compounds of the formula I in which $Q_1$ is a radical with at least one carbon atom which, together with the —CH=CQ$_2$— group, forms a 3- to 20-membered alicyclical ring which optionally contains one or more heteroatoms chosen from the group consisting of silicon, oxygen, nitrogen and sulfur; and which is unsubstituted or substituted by halogen, =O, —CN, —NO$_2$, R$_1$R$_2$R$_3$Si—(O)$_u$, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{12}$alkyl, $C_1$-$C_{12}$haloalkyl, $C_1$-$C_{12}$hydroxyalkyl, $C_1$-$C_4$cyanoalkyl, $C_3$-$C_6$cycloalkyl, $C_6$-$C_{12}$aryl, $C_7$-$C_{12}$aralkyl, $C_3$-$C_6$heterocycloalkyl, $C_3$-$C_{12}$heteroaryl, $C_4$-$C_{12}$heteroaralkyl or R$_4$—X—; or in which two adjacent C atoms in this radical $Q_1$ are substituted by —CO—O—CO— or —CO—NR$_5$—CO—; or in which an alicyclical, aromatic or heteroaromatic ring which is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{12}$alkyl, $C_1$-$C_{12}$haloalkyl, $C_1$-$C_{12}$hydroxyalkyl, $C_1$-$C_4$cyanoalkyl, $C_3$-$C_6$cycloalkyl, $C_6$-$C_{12}$aryl, $C_7$-$C_{12}$aralkyl, $C_3$-$C_6$heterocycloalkyl, $C_3$-$C_{12}$heteroaryl, $C_4$-$C_{12}$heteroaralkyl or R$_{13}$—X$_1$— is optionally fused onto adjacent carbon atoms;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are $C_1$-$C_6$alkyl, $C_1$-$C_6$perfluoroalkyl, phenyl or benzyl;

M is an alkali metal and M$_1$ is an alkaline earth metal;

R$_4$ and R$_{13}$ independently of one another are $C_1$-$C_{12}$alkyl, $C_1$-$C_{12}$haloalkyl, $C_1$-$C_{12}$hydroxyalkyl, $C_3$-$C_8$cycloalkyl, $C_6$-$C_{12}$aryl or $C_7$-$C_{12}$aralkyl;

R$_5$ and R$_{10}$ independently of one another are hydrogen, $C_1$-$C_6$alkyl, phenyl or benzyl, where the alkyl groups in turn are unsubstituted or substituted by $C_1$-$C_6$alkoxy or $C_3$-$C_6$cycloalkyl;

R$_6$, R$_7$ and R$_8$ independently of one another are $C_1$-$C_6$alkyl, $C_1$-$C_6$perfluoroalkyl, phenyl or benzyl;

u is 0 or 1;

where the alicyclical ring formed with $Q_1$ optionally contains further non-aromatic double bonds;

$Q_2$ is hydrogen, $C_1$-$C_{12}$alkyl, $C_1$-$C_{12}$haloalkyl, $C_1$-$C_6$alkoxy, halogen, —CN or R$_{11}$—X$_2$—;

R$_{11}$ is $C_1$-$C_{12}$alkyl, $C_1$-$C_{12}$haloalkyl, $C_1$-$C_{12}$hydroxyalkyl, $C_3$-$C_6$cycloalkyl, $C_6$-$C_{12}$aryl or $C_7$-$C_{12}$aralkyl;

X$_2$ is —C(O)—O— or —C(O)—NR$_{12}$; and

R$_{12}$ is hydrogen, $C_1$-$C_6$alkyl, phenyl or benzyl;

where the cycloalkyl, heterocycloalkyl, aryl, heteroaryl, aralkyl and heteroaralkyl groups are unsubstituted or substituted by $C_1$-$C_6$alkyl, $C_1$-$C_6$alkoxy, —NO$_2$, —CN or halogen, and where the heteroatoms of the heterocycloalkyl, heteroaryl and heteroaralkyl groups are chosen from the group consisting of —O—, —S—, —NR$_9$— and —N═; and R$_9$ is hydrogen, C$_1$–C$_6$alkyl, phenyl or benzyl.

Preferred compounds of the formula I from this group are those in which

Q$_1$ is a radical with at least one carbon atom which, together with the —CH═CQ$_2$— group, forms a 3- to 10-membered alicyclical ring which optionally contains a heteroatom chosen from the group consisting of silicon, oxygen, nitrogen and sulfur and is unsubstituted or substituted by halogen, —CN, —NO$_2$, R$_1$R$_2$R$_3$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_4$—X—; or in which an alicyclical, aromatic or heteroaromatic ring which is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_{13}$—X$_1$— is optionally fused onto adjacent carbon atoms;

R$_1$, R$_2$ and R$_3$ independently of one another are C$_1$–C$_4$alkyl, C$_1$–C$_4$perfluoroalkyl, phenyl or benzyl;

M is an alkali metal and M$_1$ is an alkaline earth metal;

R$_4$ and R$_{13}$ independently of one another are C$_1$–C$_6$alkyl, C$_1$–C$_6$haloalkyl, C$_1$–C$_6$hydroxyalkyl or C$_3$–C$_6$cycloalkyl;

X and X$_1$ independently of one another are —O—, —S—, —CO—, —SO— or —SO$_2$—;

R$_6$, R$_7$ and R$_8$ independently of one another are C$_1$–C$_4$alkyl, C$_1$–C$_4$perfluoroalkyl, phenyl or benzyl; and Q$_2$ is hydrogen.

The process according to the invention is particularly suitable for polymerization of norbornene and norbornene derivatives. Particularly preferred compounds from these norbornene derivatives are those which correspond either to the formula II

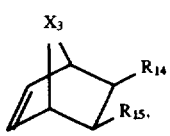

(II)

in which

X$_3$ is —CHR$_{16}$—, oxygen or sulfur;

R$_{14}$ and R$_{15}$ independently of one another are hydrogen, —CN, trifluoromethyl, (CH$_3$)$_3$Si—O—, (CH$_3$)$_3$Si— or —COOR$_{17}$; and R$_{16}$ and R$_{17}$ independently of one another are hydrogen, C$_1$–C$_{12}$-alkyl, phenyl or benzyl;

or to the formula III

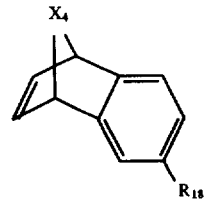

(III)

in which

X$_4$ is —CHR$_{19}$—, oxygen or sulfur;

R$_{19}$ is hydrogen, C$_1$–C$_{12}$alkyl, phenyl or benzyl; and

R$_{18}$ is hydrogen, C$_1$–C$_6$alkyl or halogen;

or to the formula IV

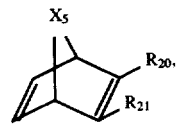

(IV)

in which

X$_5$ is —CHR$_{22}$—, oxygen or sulfur;

R$_{22}$ is hydrogen, C$_1$–C$_{12}$alkyl, phenyl or benzyl;

R$_{20}$ and R$_{21}$ independently of one another are hydrogen, CN, trifluoromethyl, (CH$_3$)$_3$Si—O—, (CH$_3$)$_3$Si— or —COOR$_{23}$; and R$_{23}$ is hydrogen, C$_1$–C$_{12}$alkyl, phenyl or benzyl;

or to the formula V

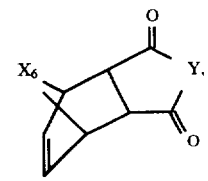

(V)

in which

X$_6$ is —CHR$_{24}$—, oxygen or sulfur;

R$_{24}$ is hydrogen, C$_1$–C$_{12}$alkyl, phenyl or benzyl;

Y is oxygen or $$\diagup N-R_{25};$$

and

R$_{25}$ is hydrogen, methyl, ethyl or phenyl.

The following compounds of the formula I are particularly suitable for the polymerization process according to the invention, bi- and polycyclical systems being accessible by Diels-Alder reactions:

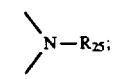

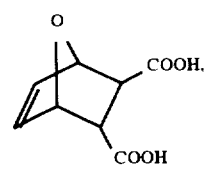

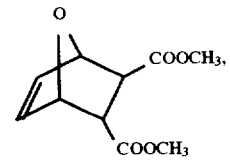

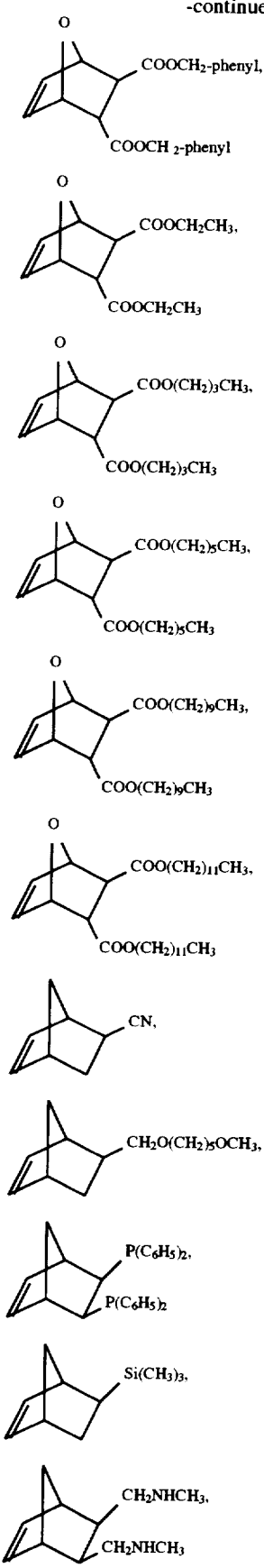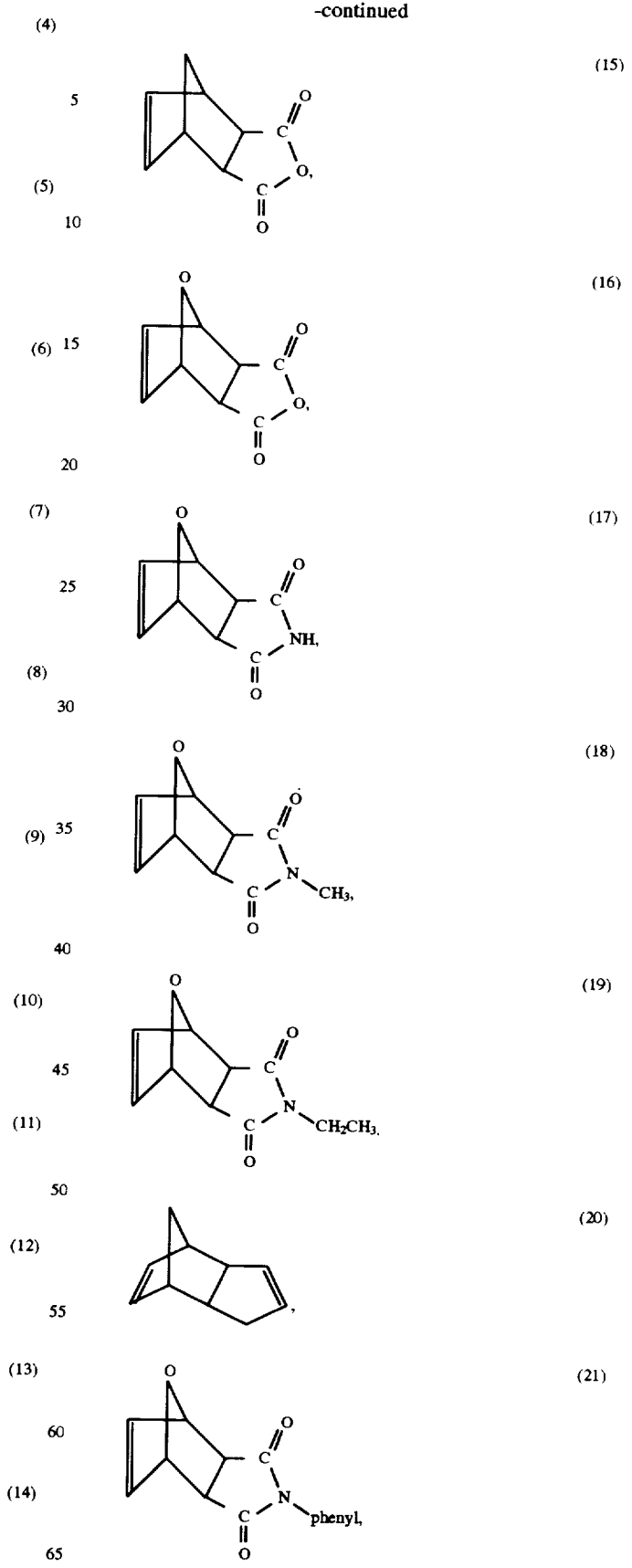

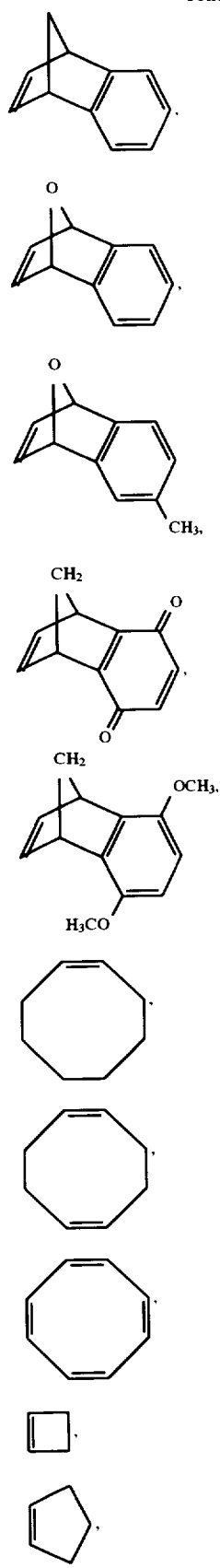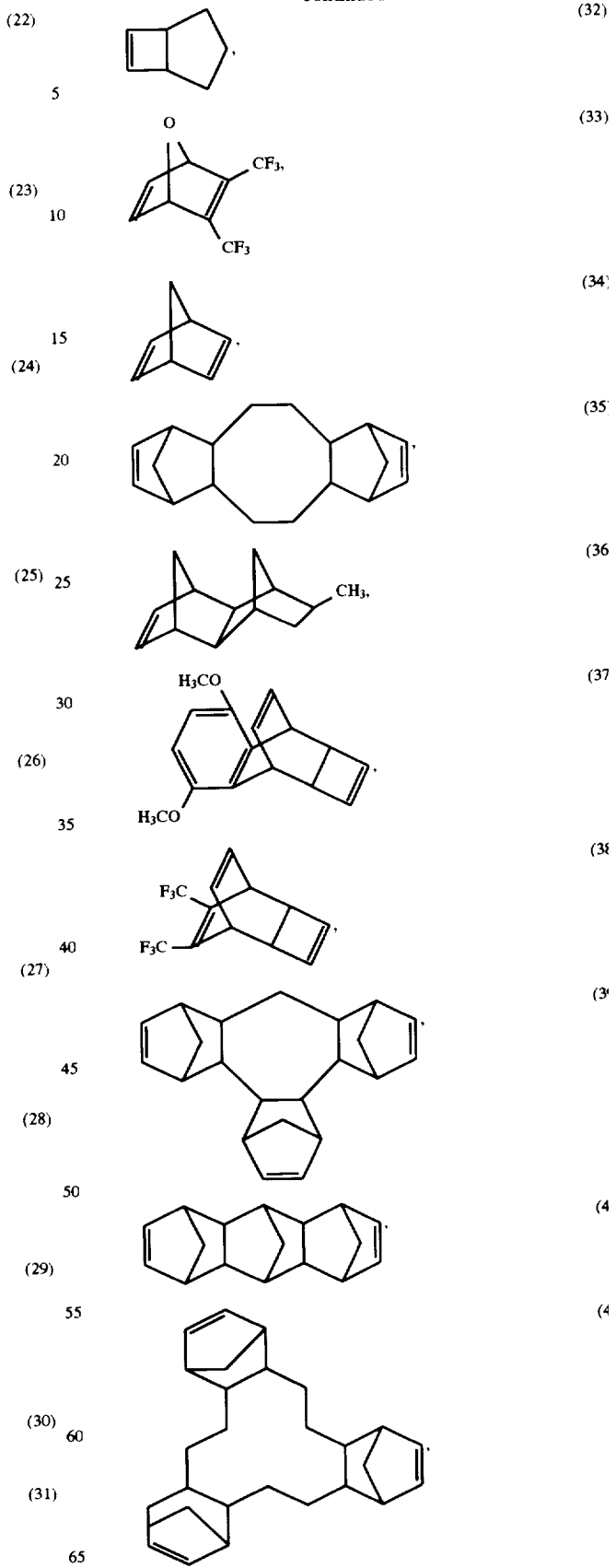

13

-continued

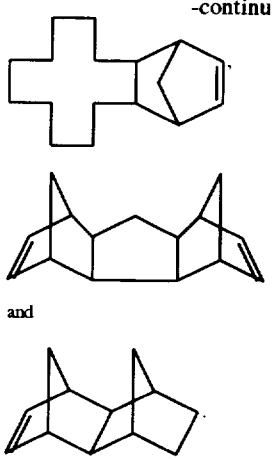

and

The titanium(IV), niobium(V) and tantalum(V) compounds to be used according to the invention are those which contain one metal atom. The molybdenum (VI) and tungsten (VI) compounds to be used according to the invention can be those which contain one metal atom or two metal atoms which are bonded via a single, double or triple bond. The other valencies of the titanium, niobium, tantalum, molybdenum and tungsten are preferably satisfied by heat-stable neutral ligands, the definition of heat stability having been given above. The halogen bonded to the metal atom is preferably F, Cl, Br and I, more preferably F, Cl and Br, and particularly preferably F or Cl. The silylmethyl ligand preferably corresponds to the formula VII $$-CH_2-SiR_{29}R_{30}R_{31} \qquad (VII)$$

in which $R_{29}$, $R_{30}$ and $R_{31}$ independently of one another are $C_1-C_{18}$alkyl, $C_5$- or $C_6$cycloalkyl, or phenyl or benzyl which are unsubstituted or substituted by $C_1-C_6$alkyl or $C_1-C_6$alkoxy.

Alkyl $R_{29}$ to $R_{31}$ can be linear or branched and can preferably contain 1 to 12, particularly preferably 1 to 8, and in particular 1 to 4 C atoms. Methyl and ethyl are the particularly preferred alkyl.

Preferred substituents for phenyl and benzyl $R_{29}$ to $R_{31}$ in the context of the definitions are methyl, ethyl, methoxy and ethoxy.

In a preferred embodiment, $R_{29}$ to $R_{31}$ in the group of the formula VII are $C_1-C_4$alkyl, phenyl or benzyl.

Some examples of the group of the formula VII are
$-CH_2-Si(CH_3)_3$, $-CH_2-Si(C_2H_5)_3$, $-CH_2-Si(n-C_3H_7)_3$, $-CH_2-Si(n-C_4H_9)_3$, $-CH_2-Si(CH_3)_2(n-C_4H_9)$, $-CH_2-Si(CH_3)_2(t-C_4H_9)$, $-CH_2-Si(CH_3)_2(C_2H_5)$, $-CH_2-Si(CH_3)_2[C(CH_3)_2CH(CH_3)_2]$, $-CH_2-Si(CH_3)_2(n-C_{12}H_{25})$, $-CH_2-Si(CH_3)_2(n-C_{18}H_{37})$, $-CH_2-Si(C_6H_5)_3$, $-CH_2-Si(CH_2-C_6H_5)_3$, $-CH_2-Si(CH_2-C_6H_5)(CH_3)_2$ and $-CH_2-Si(CH_2-C_6H_5)(CH_3)_2$. $-CH_2-Si(CH_3)_3$ is especially preferred.

The other valencies of the Ti(IV), Nb(V), Ta(V), Mo(VI) and W(VI) atoms can be satisfied by identical or different neutral ligands, for example from the group consisting of =O, =N—$R_{33}$, secondary amines having 2 to 18 C atoms, $R_{32}$O—, $R_{32}$S—, halogen, optionally substituted cyclopentadienyl, bridged biscyclopentadienyl, tridentate monoanionic ligands and neutral ligands, for example ethers, nitriles, CO and tertiary phosphines and amines, in which the radicals $R_{32}$ independently of one another are linear or branched $C_1-C_{18}$alkyl which is unsubstituted or substituted by $C_1-C_6$alkoxy or halogen, $C_5$- or $C_6$cycloalkyl which is unsubstituted or substituted by $C_1-C_6$alkyl, $C_1-C_6$alkoxy or halogen, phenyl which is unsubstituted or substituted by $C_1-C_6$alkyl, $C_1-C_6$alkoxy, $C_1-C_6$alkoxymethyl, $C_1-C_6$alkoxyethyl or halogen, or benzyl or phenylethyl which are unsubstituted or substituted by $C_1-C_6$alkyl, $C_1-C_6$alkoxy, $C_1-C_6$alkoxymethyl, $C_1-C_6$alkoxyethyl or halogen; and $R_{33}$ is linear or branched $C_1-C_{18}$alkyl which is unsubstituted or substituted by $C_1-C_6$alkoxy, $C_5$- or $C_6$cycloalkyl which is unsubstituted or substituted by $C_1-C_6$alkyl, $C_1-C_6$alkoxy or halogen, phenyl which is unsubstituted or substituted by $C_1-C_6$alkyl, $C_1-C_6$alkoxy, $C_1-C_6$alkoxymethyl, $C_1-C_6$alkoxyethyl, di($C_1-C_6$alkyl)amino, di($C_1-C_6$alkyl)amino-$C_1-C_3$alkyl or halogen, or benzyl or phenylethyl which are unsubstituted or substituted by $C_1-C_6$alkyl, $C_1-C_6$alkoxy, $C_1-C_6$alkoxymethyl, $C_1-C_6$alkoxyethyl or halogen, with the proviso that in the case of the titanium compounds, the ligand is not =O or =N—$R_{33}$.

Secondary amines are preferably those of the formula $R_{34}R_{35}$N—, in which $R_{34}$ and $R_{35}$ independently of one another are linear or branched $C_1-C_{18}$alkyl, $C_5$- or $C_6$cycloalkyl, benzyl or phenylethyl which are unsubstituted or substituted by $C_1-C_6$alkoxy or halogen, or ($C_1-C_6$alkyl)$_3$Si; or together are tetramethylene, pentamethylene or 3-oxapentane-1,5-diyl. The alkyl preferably contains 1 to 12, and particularly preferably 1 to 6 C atoms. Some examples are dimethyl-, diethyl-, di-n-propyl-, di-i-propyl-, di-n-butyl-, methyl-ethyl-, dibenzyl-, benzylmethyl-, diphenyl- and phenyl-methylamino and di(trimethylsilyl)amino.

Halogen as a further ligand on the metal atoms or as a substituent is preferably fluorine or chlorine, and particularly preferably chlorine.

The cyclopentadienyl can be unsubstituted or substituted by one to five $C_1-C_4$alkyl, in particular methyl or —Si($C_1-C_4$alkyl) [sic], in particular Si(CH$_3$)$_3$. Bridged cyclopentadienyls are, in particular, those of the formula $R_{36}$—A—$R_{36}$, in which $R_{36}$ is cyclopentadienyl which is unsubstituted or substituted by one to five $C_1-C_4$alkyl, in particular methyl or —Si($C_1-C_4$alkyl) [sic], in particular —Si(CH$_3$)$_3$, and A is —CH$_2$—, —CH$_2$—CH$_2$—, —Si(CH$_3$)$_2$, —Si(CH$_3$)$_2$—Si(CH$_3$)$_2$ or —Si(CH$_3$)$_3$—O—Si(CH$_3$)$_2$.

Ethers as neutral ligands can be dialkyl ethers having 2 to 8 C atoms or cyclical ethers having 5 or 6 ring members. Some examples are diethyl ether, methyl ethyl ether, diethyl ether, di-n-propyl ether, di-i-propyl ether, di-n-butyl ether, ethylene glycol dimethyl ether, tetrahydrofuran and dioxane.

Nitriles as neutral ligands can be aliphatic or aromatic nitriles having 1 to 12, preferably 1 to 8 C atoms. Some examples are acetonitrile, propionitrile, butylnitrile, benzonitrile and benzylnitrile.

Tertiary amines and phosphines as neutral ligands can be those having 3 to 24, preferably 3 to 18 C atoms. Some examples are trimethylamine and -phosphine, triethylamine and -phosphine, tri-n-propylamine and -phosphine, tri-n-butylamine and -phosphine, triphenylmethyl and -phosphine, tricyclohexylamine and -phosphine, phenyldimethylamine and -phosphine, benzyldimethylamine and -phosphine and 3,5-dimethylphenyl-dimethylamine and -phosphine.

The tridentate monoanionic ligands can be, for example, hydro(trispyrazol-1-yl)borates or alkyl(trispyrazol-1-yl) borates, which are unsubstituted or substituted by one to three $C_1-C_4$alkyl [cf. Trofimenko, S., Chem. Rev., 93:943–980 (1993)], or [C$_5$(R'$_5$)Co(R$_{37}$R$_{38}$P=O)$_3$], in which R' is H or methyl and $R_{37}$ and $R_{38}$ independently of one another are $C_1-C_4$alkyl, $C_1-C_4$alkoxy or phenyl [cf. Kläui, W., Angew. Chem. 102:661–670 (1990)].

Halogen as a substituent for the radicals $R_{32}$ and $R_{33}$ is preferably fluorine, and particularly preferably chlorine. The substituents alkyl, alkoxy or alkoxy in alkoxymethyl or -ethyl preferably contain 1 to 4, and in particular 1 or 2 C atoms. Examples are methyl, ethyl, n- and i-propyl, n-, i- and t-butyl, methoxy, ethoxy, n- and i-propyloxy and n-, i- and t-butyloxy.

Alkyl $R_{32}$ and $R_{33}$ preferably contain 1 to 12, particularly preferably 1 to 8, and especially preferably 1 to 4 C atoms. Alkyl is preferably branched alkyl. Some examples of $R_{32}$ are methoxy, ethoxy, n- and i-propyloxy, n-, i- and t-butyloxy, hexafluoro-i-propyloxy and hexa- and perfluorobutyloxy.

Some examples of substituted phenyl and benzyl $R_{32}$ and $R_{33}$ are p-methylphenyl or benzyl |sic|, p-fluoro- or p-chlorophenyl or -benzyl, p-ethylphenyl or -benzyl, p-n- or i-propylphenyl or -benzyl, p-i-butylphenyl or -benzyl, 3-methyl-phenyl or -benzyl, 3-i-propylphenyl or -benzyl, 3,5-dimethylphenyl or -benzyl, 3,5-i-propylphenyl or -benzyl, 3,5-n- or -t-butylphenyl and -benzyl. $R_{33}$ is particularly preferably phenyl which is unsubstituted or substituted by $C_1$–$C_4$alkyl or $C_1$–$C_4$alkoxy.

In a preferred embodiment, the metal compounds correspond, in particular, to the formulae VIII, VIIIa or VIIIb

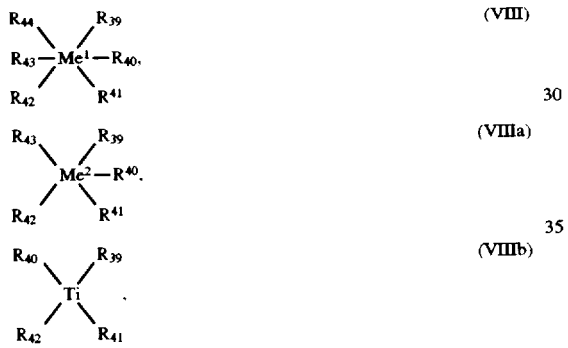

(VIII)

(VIIIa)

(VIIIb)

in which $Me_1$ is Mo(VI) or W(VI);

$Me_2$ is Nb(V) or Ta(V);

one of the radicals $R_{39}$ to $R_{44}$ is a radical —$CH_2SiR_{29}R_{30}R_{31}$ of the formula VII;

at least one of the radicals $R_{39}$ to $R_{44}$ is F, Cl or Br;

$R_{29}$, $R_{30}$ and $R_{31}$ independently of one another are $C_1$–$C_6$alkyl, $C_5$- or $C_6$cycloalkyl, or phenyl or benzyl which are unsubstituted or substituted by $C_1$–$C_6$alkyl or $C_1$–$C_6$alkoxy;

in formula VII two or in each case two and in formula VIIIa two of the other radicals of $R_{39}$ to $R_{44}$ each together are =O or =N—$R_{33}$, and $R_{33}$ is linear or branched $C_1$–$C_{18}$alkyl which is unsubstituted or substituted by $C_1$–$C_6$alkoxy, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, and the other radicals $R_{39}$ to $R_{43}$ are secondary amino having 2 to 18 C atoms, $R_{32}$O— or $R_{32}$S—, halogen, unsubstituted or substituted cyclopentadienyl or bridged biscyclopentadienyl or a neutral ligand, in which the $R_{32}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen; or in the formulae VIII, VIIIa and VIIIb the other radicals of $R_{39}$ to $R_{44}$ independently of one another are secondary amino having 2 to 18 C atoms, $R_{32}$O— or $R_{32}$S—, halogen, unsubstituted or substituted cyclopentadienyl or bridged biscyclopentadienyl or a neutral ligand in which the $R_{32}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen.

The preferences given above apply to the radicals $R_{29}$ to $R_{33}$.

In a particularly preferred embodiment, titanium niobium, tantalum, molybdenum or tungsten compound which are used in the process according to the invention ar those of the formulae VIII, VIIIa and VIIIb in which $R_{39}$ is a radical of the formula VII —$CH_2Si(R_{29}R_{30}R_{31})$;

$R_{40}$ is F, Cl or Br; and (a) in formula VIII $R_{41}$ and $R_{42}$, and $R_{43}$ and $R_{44}$, in eac case together, are the radical =N—$R_{33}$, or $R_{41}$ and $R_4$ together are the radical =N—$R_{33}$ and $R_{43}$ and $R_4$ independently of one another are unsubstituted or subst tuted cyclopentadienyl, $R_{32}$—O— or halogen, or (b) in formula VIIIa $R_{41}$ and $R_{42}$ together are the radic: =N—$R_{33}$, and $R_{43}$ is unsubstituted or substitute cyclopentadienyl, $R_{32}$—O— or halogen, or in formul VIIIa $R_{41}$, $R_{42}$ and $R_{43}$ independently of one another ar unsubstituted or substituted cyclopentadienyl, $R_{32}$—O— or halogen, or (c) in formula VIIIb $R_{41}$ and $R_{42}$ independently of or another are unsubstituted or substituted cyclopentadieny $R_{32}$—O— or halogen, where $R_{29}$ to $R_{33}$ have the above meanings. The abov preferences apply to $R_{29}$, $R_{30}$, $R_{31}$, $R_{32}$ and $R_{33}$.

Metal compounds which are especially preferably used the process according to the invention are those of tl formulae IX, IXa, IXb, IXc or IXd

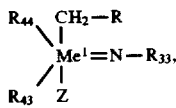

(I

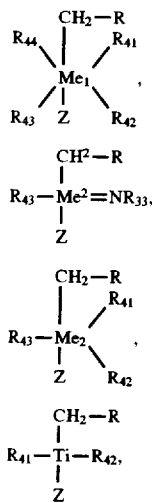

in which

Me$_1$ is Mo(VI) or W(VI);

Me$_2$ is Nb(V) or Ta(V);

R is —Si(C$_1$–C$_4$alkyl)$_3$;

Z is Cl or Br;

R$_{33}$ is phenyl or phenyl which is substituted by 1 to 3 C$_1$–C$_4$alkyl or C$_1$–C$_4$alkoxy.

(a) R$_{43}$ and R$_{44}$ in formula IX together are the group =NR$_{33}$ or individually independently of one another are F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl;

(b) R$_{41}$, R$_{42}$ and R$_{43}$ and R44 in formula IXa independently of one another are F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl;

(c) R$_{43}$ in formula IXb is F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl;

(d) R$_{41}$, R$_{42}$ and R$_{43}$ in formula IXc independently of one another are F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl; and (e) R$_4$, and R$_{42}$ in formula IXd independently of one another are F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl.

The alkoxy is particularly preferably branched alkoxy which is optionally partly or completely substituted by F, for example i-propyloxy, i- and t-butyloxy, hexafluoropopyloxy [sic] and nonafluoropropyloxy. The phenyloxy radical is, in particular, phenyloxy which is substituted by C$_1$–C$_4$alkyl in the 2,6-positions, for example 2,6-dimethylphenyloxy. Examples of substituted cyclopentadienyl radicals are mono- to pentamethylcyclopentadienyl and trimethylsilylcyclopentadienyl. R$_{33}$ is preferably phenyl or phenyl which is substituted by C$_1$–C$_4$alkyl, in particular phenyl or 3,5-dimethyl-, 2,6-dimethyl-, 3,5-diethyl- and 2,6-diethylphenyl.

Especially preferred compounds in the process according to the invention are those of the formulae X, Xa, Xb, Xc and Xd

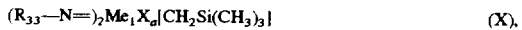

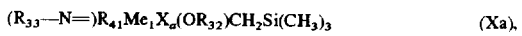

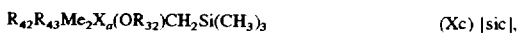

in which

Me$_1$ is Mo(VI) or W(VI);

Me$_2$ is Nb(V) or Ta(V);

X$_a$ is F or Cl;

R$_{33}$ is phenyl or phenyl which is substituted by 1 or 2 C$_1$–C$_4$alkyl groups;

R$_{32}$ is branched C$_3$- or C$_4$alkyl which is optionally partly or completely substituted by fluorine, or phenyloxy, or phenyloxy which is substituted by 1 to 3 methyl or ethyl groups;

R$_{42}$ and R$_{43}$ independently of one another are cyclopentadienyl which is unsubstituted or substituted by 1 to 5 methyl groups, X$_a$ or R$_{32}$O—; and R$_{41}$ is cyclopentadienyl which is unsubstituted or substituted by 1 to 5 methyl groups, X$_a$ or R$_{32}$O—.

Some examples of titanium(IV), niobium(V), tantalum (V), molybdenum(VI) and tungsten(VI) compounds are [Cp is cyclopentadienyl and Me is Nb(V) or Ta(V)]:

Ti[CH$_2$Si(CH$_3$)$_3$]Cl$_3$, Ti[CH$_2$Si(CH$_3$)$_3$]Br$_3$, Cp$_2$Ti[CH$_2$Si(CH$_3$)$_3$]Cl, (CH$_3$)$_2$Ti[CH$_2$Si(CH$_3$)$_3$]Cl, Cp$_2$Ti[CH$_2$Si(CH$_3$)$_3$]Br, Cp$_2$Ti[CH$_2$Si(CH$_3$)$_3$]I, CpTi[CH$_2$Si(CH$_3$)$_3$][CH$_3$]Cl, CpTi[CH$_2$Si(CH$_3$)$_3$]Br$_2$, [(CH$_3$)$_2$CHO]$_2$Ti[CH$_2$Si(CH$_3$)$_3$]Cl, [(CF$_3$)$_2$CHO]$_2$Ti[CH$_2$Si(CH$_3$)$_3$]Cl, [(CF$_3$)$_2$CHO]CpTi[CH$_2$Si(CH$_3$)$_3$]Cl, [(CH$_3$)$_2$CHO]CpTi[CH$_2$Si(CH$_3$)$_3$]Cl, (C$_6$H$_5$O)CpTi[CH$_2$Si(CH$_3$)$_3$]Cl, (2,6-dimethyl-C$_6$H$_5$O)CpTi[CH$_2$Si(CH$_3$)$_3$]Cl, (2,6-dimethyl-C$_6$H$_5$O)$_2$Ti[CH$_2$Si(CH$_3$)$_3$]Cl, (2,6-dimethyl-C$_6$H$_5$O)Ti[CH$_2$Si(CH$_3$)$_3$]$_2$Br, [(CH$_3$)$_3$CO]CpTi[CH$_2$Si(CH$_3$)$_3$]Cl, [(CF$_3$)$_2$(CH$_3$)CO]CpTi[CH$_2$Si(CH$_3$)$_3$]Cl, Me(=N—C$_6$H$_5$)[OCH(CH$_3$)$_2$][(CH$_2$Si(CH$_3$)$_3$]Cl, Cp$_2$Me[(CH$_2$Si(CH$_3$)$_3$]Cl$_2$, Me(=N—C$_6$H$_5$)[OCH(CF$_3$)$_2$][(CH$_2$Si(CH$_3$)$_3$]Cl, Me(=N- 2,6-diisopropylC$_6$H$_3$)[(CH$_2$Si(CH$_3$)$_3$]Cl$_2$, Me(=N-2,6-diisopropylC$_6$H$_3$)[(CH$_3$)$_2$CHO][(CH$_2$Si(CH$_3$)$_3$]Cl, Me(=N-2,6-dimethylC$_6$H$_3$)(2,6-dimethyl-C$_6$H$_5$O)[CH$_2$Si(CH$_3$)$_3$]Cl, Me(=N-2,6-dimethylC$_6$H$_3$)((CF$_3$)$_2$CHO)[CH$_2$Si(CH$_3$)$_3$]Cl, (=N-2,6-dimethylC$_6$H$_3$)CpMe[(CH$_2$Si(CH$_3$)$_3$]Cl, (C$_6$H$_5$O)$_2$CpMe[(CH$_2$Si(CH$_3$)$_3$]Cl, (=N-3,5-dimethylC$_6$H$_3$)Me[2,6-dimethylC$_6$H$_3$O)][(CH$_2$Si(CH$_3$)$_3$)]Cl, CpMe[OCH(CH$_3$)$_2$]$_2$[(CH$_2$Si(CH$_3$)$_3$]Br, CpMe[OCH(CH$_3$)$_2$]$_2$[(CH$_2$Si(CH$_3$)$_3$]Cl, CpMe[OCH(CF$_3$)$_2$]$_2$[(CH$_2$Si(CH$_3$)$_3$]Cl, Cp$_2$Me(Methyl)[(CH$_2$Si(CH$_3$)$_3$]Cl, Cp$_2$Me[OCH(CH$_3$)$_2$][(CH$_2$Si(CH$_3$)$_3$]Cl, [OCH(CH$_3$)$_2$]$_2$Me[CH$_2$Si(CH$_3$)$_3$]Cl$_2$, Me(2,6-dimethylphenyloxy)(CH$_3$O)$_2$[(CH$_2$Si(CH$_3$)$_3$]Cl, Me[CH$_2$Si(CH$_3$)$_3$][OCH(CH$_3$)](CF$_3$O)$_2$Cl, W(=N—C$_6$H$_5$)[(OC(CH$_3$)$_3$][CH$_2$—Si (CH₃)₃|Cl₂, (2,6-diisopropylphenyloxy)₂Me|CH₂Si(CH₃)₃|Cl₂, Cp₂Me|OC(CH₃)₃||(CH₂Si(CH₃)₃|Cl, CpMe|OC(CH₃)(CF₃)₂|₂|(CH₂Si(CH₃)₃|Cl, Mo₂|(CH₂—Si(CH₃)₃)(OCH₂C(CH₃)₃)Cl|₂, Mo(=N-2,6-diisopropylC₆H₃)₂|CH₂—Si(CH₃)₃|Cl, W(=N—C₆H₅)| (OC(CH₃)₃|₂|CH₂—Si(CH₃)₃|Cl, Mo(=N—C₆H₅)₂ |CH₂—Si(CH₃)₃|Cl, Mo(=N-2,6-diisopropylC₆H₃)| (OCH₂C(CH₃)₃)₂|CH₂—Si(CH₃)₃|Cl.

The titanium, niobium, tantalum, molybdenum and tungsten compounds to be used according to the invention are known or can be prepared by known and analogous processes starting from optionally correspondingly substituted metal halides by means of Grignard reactions |Schrock, R. R., Murdzeck, J. S., Bazan, G. C., Robbins, J., DiMare, M., O'Regan, M., J. Am. Chem. Soc., 112:3875–3886 (1990)|.

The process according to the invention can be carried out in the presence of an inert solvent. A particular advantage of the process according to the invention is one that in the case of liquid monomers, the process can be carried out without using a solvent. Inert means that the choice of solvent depends on the reactivity of the metal catalysts, for example that protic polar solvents are not used if substitution reactions, such as the replacement of halogen by alkoxy, are to be expected. It should be furthermore be taken into account that solvents containing C=O groups can react with the metal catalysts.

Suitable inert solvents are, for example, protic-polar and aprotic solvents, which can be used by themselves or in mixtures of at least two solvents. Examples are: ethers (dibutyl ether, tetrahydrofuran, dioxane, ethylene glycol monomethyl or dimethyl ether, ethylene glycol monoethyl or diethyl ether, diethylene glycol diethyl ether, triethylene glycol dimethyl ether), halogenated hydrocarbons (methylene chloride, chloroform, 1,2-dichloroethane, 1,1,1-trichloroethane, 1,1,2,2-tetrachloroethane), carboxylic acid esters and lactones (ethyl acetate, methyl propionate, ethyl benzoate, 2-methoxyethyl acetate, γ-butyrolactone, δ-valerolactone, pivalolactone), carboxylic acid amides and lactams (N,N-dimethylformamide, N,N-diethylformamide, N,N-dimethylacetamide, tetramethylurea, hexamethylphosphoric acid triamine, γ-butyrolactam, ε-caprolactam, N-methylpyrrolidone, N-acetylpyrrolidone, N-methylcaprolactam), sulfoxides (dimethylsulfoxide), sulfones (dimethyl sulfone, diethyl sulfone, trimethylene sulfone, tetramethylene sulfone), tertiary amines (N-methylpiperidine, N-methylmorpholine), aliphatic and aromatic hydrocarbons, for example petroleum ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are a protic polar and non-polar solvents.

Preferred solvents are aliphatic and aromatic hydrocarbons and mixtures of such solvents.

It is to be particularly emphasized that the compositions of an optionally substituted cycloolefin and catalyst which are employed according to the invention in the process are often insensitive to oxygen, which allows storage and a reaction procedure without an inert gas. However, the exclusion of moisture, that is to say the use of dry reaction and storage conditions, is advisable.

The monomers of the formula I and the catalysts employed for the process according to the invention can be stored both separately and together as a mixture, since the catalyst used has a particularly high stability. Before the photochemical polymerization, the mixture can be stored as a ready-to-use formulation, which is of advantage for use of the process according to the invention on a large industrial scale. Because of the high photosensitivity, in particular in UV light, storage is expediently with exclusion of light.

The invention also relates to a photopolymerizable composition comprising (a) a cyclical olefin or at least two different cyclical olefins and (b) a catalytically active amount of at least one heat-stable titanium(IV), niobium(V), tantalum(V), molybdenum(VI) or tungsten(VI) compound in which a silylmethyl group and at least one halogen are bonded to the metal.

The composition according to the invention can additionally comprise other non-volatile open-chain comonomers which form copolymers with the strained cycloolefins. If dienes, for example, are co-used, crosslinked polymers can form. Some examples of such comonomers are olefinically mono- or di-unsaturated compounds, such as olefins and dienes from the group consisting of pentene, hexene, heptene, octene, decene and dodecylene, acrylic and methacrylic acid, esters and amides thereof, vinyl ether, styrene, butadiene, isoprene and chlorobutadiene.

The other olefins which are capable of metathesis polymerization are contained in the composition according to the invention, for example, in an amount of up to 80% by weight, preferably 0.1 to 80% by weight, more preferably 0.5 to 60% by weight, and particularly preferably 5 to 40% by weight, based on the total amount of compounds of the formula I and other olefins capable of metathesis polymerization.

The composition according to the invention can comprise formulation auxiliaries. Known auxiliaries are antistatics antioxidants, light stabilizers, plasticizers, dyes, pigments fillers, reinforcing fillers, lubricants, adhesion promoters viscosity-increasing agents and mold release auxiliaries. The fillers can be present in surprisingly high contents withou adversely influencing the polymerization, for example ii amounts of up to 70% by weight, preferably 1 to 70% by weight, more preferably 5 to 60% by weight, particularly preferably 10 to 50% by weight, and especially preferabl 10 to 40% by weight, based on the composition. A very larg number of fillers and reinforcing fillers for improving th optical, physical, mechanical and electrical properties hav been disclosed. Some examples are glass and quartz in th form of powders, beads and fibers, metal and semimeta oxides, carbonates, such as MgCO₃, CaCO₃ and dolomite metal sulfates, such as gypsum and baryte, naturally occur ring and synthetic silicates, such as talc, zeolites, wollasto nite and felspars, aluminas, such as china clay, roc powders, whiskers, carbon fibers, synthetic fibers, powdere plastics and carbon black. Viscosity-increasing agents are, i particular metathesis polymers which contain olefinicall unsaturated groups and can be incorporated into the polyme during the polymerization. Such metathesis polymers ar known and are commercially obtainable, for example und the tradename Vestenamere®. Other viscosity-increasin agents are polybutadiene, polyisoprene o polychlorobutadiene, as well as copolymers of butadien isoprene and chloroprene with olefins. The viscosit increasing agents can be contained in an amount of 0.1 to 5 preferably 1 to 30, and particularly preferably 1 to 20% t weight, based on the composition. If fillers are used, it expedient to obtain optical transparency for the polymeriz tion or to carry out the polymerization in thin layers.

In the process according to the invention, it is not nece sary to maintain the irradiation of the reaction mixture ov the entire duration of the reaction. Once the polymerizatic has been initiated photochemically, the further course of tl reaction takes place independently, even in the dark. The irradiation is advantageously carried out with light of a wavelength in the range from 50 nm to 1000 nm, preferably in the range from 200 to 500 nm, and especially preferably in the UV range. The duration of the irradiation depends on the nature of the light source. UV lasers or UV lamps are preferably employed according to the invention. The irradiation of the catalyst can be carried out both before or during and after the addition of the monomers.

Suitable irradiation times are one minute to 8 hours, in particular 5 minutes to 4 hours. The sequence of the addition of the monomers and catalyst is not critical. The monomer can be both initially introduced into the reaction vessel and added after introduction of the catalyst. Likewise, the catalyst can be irradiated beforehand and the monomer then added. Furthermore, the solution comprising catalyst and monomer can also be irradiated.

The process according to the invention is preferably carried out at room temperature to slightly elevated temperature. An increase in temperature increases the rate of reaction. The catalysts used initiate a thermal polymerization by themselves only in exceptional cases. A photopolymerization chiefly takes place at the temperatures chosen for acceleration of the reaction. However, it should be mentioned that the catalysts can be converted into thermoactive catalysts by adequate irradiation.

The process according to the invention is carried out, in particular, at temperatures from −20° C. to +110° C.

It is a quite particular and surprising advantage of the process according to the invention that the titanium(IV), niobium(V), tantalum(V), molybdenum and tungsten compounds used act as thermal catalysts after the irradiation. This results in the possibility of continuing and ending the polymerization by supplying heat after a short irradiation time, which offers economic and industrial advantages in various areas of production of shaped articles or coatings. In particular, the combined process is favorable for the preparation of thermoplastics.

The invention also relates to a process for photocatalytically induced and subsequent thermal polymerization of a cyclical olefin or at least two different cyclical olefins in the presence of a metal compound as the catalyst, which is characterized in that a) the cycloolefins are first irradiated in the presence of a catalytic amount of at least one heat-stable titanium(IV), niobium(V), tantalum(V), molybdenum(VI) or tungsten (VI) compound in which a silylmethyl group and at least one halogen is |sic| bonded to the metal; or a catalytic amount of a heat-stable titanium(IV), niobium(V) or tantalum(V) compound in which a silylmethyl group and at least one halogen is |sic| bonded to the metal is irradiated, if appropriate in an inert solvent, and then mixed with at least one cycloolefin; and (b) the polymerization is then ended by heating and without irradiation.

The preferences stated above apply to process stage a). The duration of the irradiation essentially depends on the desired reaction procedure. Brief irradiation is chosen, for example, if the polymerization is only to be initiated by irradiation and is to be ended by heating. Brief can mean an irradiation time of up to 60 seconds, preferably 5 to 60 seconds, and particularly preferably 10 to 40 seconds. A longer irradiation time is chosen, for example, if the polymerization is chiefly to be carried out with irradiation and the final polymerization is to be ended only by after-heating.

Heating in process stage b) can mean a reaction temperature of 50° to 200° C., preferably 50° to 150° C., and particularly preferably 70° to 120° C.

Catalytic amounts in the context of the present invention preferably means an amount of 0.001 to 20 mol %, particularly preferably 0.01 to 15 mol %, and especially preferably 0.01 to 10 mol %, based on the amount of the monomer.

The invention also relates to a process for the preparation of thermal catalysts for ring-opening metathesis polymerization of cyclical olefins, which is characterized in that a heat-stable titanium(IV), niobium(V), tantalum(V), molybdenum(VI) or tungsten(VI) compound in which a silylmethyl group and at least one halogen is |sic| bonded to the metal is irradiated in bulk or in a solvent.

The cycloolefins to be used according to the invention are strained rings. Cyclohexene, as an exception, generally cannot be homopolymerized with olefin metathesis. This exception is known to the expert and described, for example, in Ivin |Ivin, K. J. in: Ivin, K. J., Saegusa, T. (editors), Ring-Opening Polymerisation 1:139–144 Elsevier Applied Science Publishers, London and New York (1984)|.

Radiation-cured oligomers and polymers having identical or different structural units of the formula XI

(XI)

in which $Q_1$ and $Q_2$ have the meanings given under formula I, can be prepared by the process according to the invention. The preferences stated above apply to these polymers. They can be homopolymers or copolymers with random distribution of the structural units, graft polymers or block polymers. They can have an average molecular weight ($\overline{Mw}$) of, for example, 500 to 2 million Dalton, preferably 1000 to 1 million Dalton (determined by GPC by comparison with polystyrene standards of narrow distribution).

Thermoplastically deformable materials for the production of shaped articles of all types, coatings and images in relief can be prepared by the process according to the invention.

The polymers prepared according to the invention can have very different properties, depending on the monomer used. Some of them are distinguished by a very high permeability to oxygen, low dielectric constants, good heat stability and low absorption of water. Others have outstanding optical properties, for example high transparency and low refractive indices. The low shrinkage is furthermore to be emphasized in particular. They can therefore be used in very different industrial fields.

As layers on the surfaces of carrier materials, the compositions according to the invention are distinguished by a high adhesive strength. The coated materials are furthermore distinguished by a very high surface smoothness and gloss. Of the good mechanical properties, the low shrinkage and the high impact strength, as well as the heat stability is |sic| to be emphasized in particular. The easy release from the mold and the high resistance to solvents is |sic| furthermore to be mentioned.

These polymers are suitable for the production of medical equipment, implants or contact lenses; for the production of electronic components; as binders for coatings; as photocurable compositions for model construction or as adhesives for gluing substrates with low surface energies (for example Teflon, polyethylene and polypropylene), as well as a photopolymerizable composition in stereolithography. The compositions according to the invention can also be used for the production of coatings by photopolymerization, it being possible on the one hand for clear (transparent) and even pigmented compositions to be used. Both white and colored pigments can be used. The production of shaped articles by thermoplastic shaping processes for all types of commodity articles may furthermore be mentioned.

The photocurable or photo- and thermocurable compositions according to the invention are particularly suitable for the production of protective coatings and images in relief. The invention also relates to a variant of the process according to the invention for the production of coated materials or relief images on substrates in which a composition of a cyclical olefin, catalyst and optionally solvent is applied as a layer to a carrier, for example by dipping, brushing, pouring, rolling, knife-coating or whirler pouring processes, the solvent is removed, if appropriate, and the layer is irradiated for polymerization, or the layer is irradiated through a photomask and the non-irradiated portions are then removed with a solvent. Surfaces of substrates can be modified or protected by this process, or, for example, printed circuits, printing plates or printing rolls can be produced. In the production of printed circuits, the compositions according to the invention can also be employed as solder resists. Other possible uses are the production of screen printing masks and use as radiation-curable printing inks for offset, screen and flexographic printing.

The present invention also relates to a carrier material which is coated with an oligomer or polymer according to the invention and comprises a crosslinking agent. The present invention also relates to a carrier material which is coated with an oligomer or polymer according to the invention. These materials are suitable for the production of protective coatings or images in relief by irradiation (if appropriate under a photomask) and subsequent development with a solvent. Suitable crosslinking agents, which can be contained, for example, in an amount of 0.01 to 20% by weight, are, above all, organic bisazides, in particular the commercially available 2,6-bis(4-azidobenzylidene)-4-methyl-cyclohexanone.

The present invention furthermore relates to a coated carrier material, characterized in that a layer of (a) a cyclical olefin or at least two different cyclical olefins and (b) a catalytically active amount of at least one heat-stable titanium(IV), niobium(V), tantalum(V), molybdenum(VI) or tungsten(VI) compound in which a silylmethyl group and at least one halogen is [sic] bonded to the metal is applied to a carrier.

Suitable carrier materials are, for example, those of glass, minerals, ceramics, plastics, wood, semimetals, metals, metal oxides and metal nitrides. The layer thicknesses essentially depend on the desired use and can be, for example, 0.1 to 1000 μm, preferably 0.5 to 500 μm, particularly preferably 1 to 100 μm. The coated materials are distinguished by a high adhesive strength and good thermal and mechanical properties.

The production of the coated materials according to the invention can be carried out by known methods, for example brushing, knife-coating, pouring processes, such as curtain pouring or whirler pouring.

Particularly good results are often achieved in coatings if cycloolefins which additionally contain one to three, and preferably one, further double bond and are polycyclical fused ring systems in the context of the invention are used for the photometathesis polymerization.

The following examples illustrate the invention further.

A) Preparation of catalysts

EXAMPLE A1:

Preparation of $[(H_3C)_2CHO]_2TiCl[CH_2—Si(CH_3)_3]$

The preparation is carried out in situ by the reaction of equimolar amounts of $Cl_2Ti[OCO(CH_3)_2]_2$ and $LiCH_2Si(CH_3)_3$ in diethyl ether.

EXAMPLE A2

Preparation of $Ta[CH_2Si(CH_3)_3]Cl_4$

The title compound is prepared in accordance with the instructions of Moorehouse and Wilkinson [Moorehouse, S., Wilkinson, G., J. Chem. Soc.; Dalton Trans., 2187–2190 (1974)].

EXAMPLE A3

Preparation of $W(=N—C_6H_5)[OC(CH_3)_3]_2[CH_2Si(CH_3)_3]Cl$ 2.0 g (3.0 mmol) of $[(C_2H_5)_4]N[W(=N—C_6H_5)(OC(CH_3)_3)Cl_3]$ in 50 ml of methylene chloride are cooled to $-78°$ C. and a solution of 0.36 g (1.5 mmol) of $Zn[CH_2Si(CH_3)_3]_2$ and 0.21 g (1.5 mmol) of $ZnCl_2$ are then added dropwise over a period of 2 hours. The mixture is allowed to warm to room temperature and is stirred for a further 2 hours. The solvent is stripped off in vacuo and the residue is extracted with hexane (2×50 ml), and the product is crystallized out by cooling the concentrated hexane solution to $-30°$ C. 1.01 g (62%) of the title compound is obtained.

B) Preparation of polymers

Example 1 to 3

Polymerization of norbornene

The catalyst is initially introduced into 5 ml of toluene in a Schlenk vessel. Norbornene in toluene is then added and the vessel is closed. The mixture is irradiated, while stirring. After about 15 seconds, an increase in viscosity is observed. After 5 minutes, the reaction is interrupted by addition of one drop of benzaldehyde and the reaction mixture is poured into 100 ml of ethanol. The polymer which has precipitated out is filtered off, washed with ethanol and then dried in vacuo. The polymer can be characterized by gel permeation chromatography [GPC; solvent tetrahydrofuran, the number-average ($M_n$) and weight-average values ($M_w$) of the molecular weight are determined in relation to a poly styrene calibrated standard] and $^1$H-NMR (Bruker 300 MHz; solvent $CDCl_3$).

An identical experiment without exposure to light at 45 C. gives no increase in viscosity and, after addition o ethanol, no polymer precipitates out.

The catalysts employed are:
A=—$[(H_3C)_2CHO]_2TiCl[CH_2—Si(CH_3)_3]$.
B=$Ta[CH_2Si(CH_3)_3]Cl_4$
C=$W(=N—C_6H_5)[OC(CH_3)_3]_2[CH_2Si(CH_3)_3]Cl$.

Compound (1) is employed as the monomer.

The light source used is:

200 W mercury vapor medium-pressure UV lamp (Osram HBO 200 W/2, manufacturer Spindler and Hoyer Göttingen).

The results are shown in Table 1:

TABLE 1

| Example | Norbornene | Catalyst | Yield | $M_n$ | $M_n/M_w$ |
|---|---|---|---|---|---|
| 1 | 500 mg | 10 mg A | 28% | 15 k | 1.5 |
| 2 | 500 mg | 10 mg B | 78% | 32 k | 1.6 |
| 3 | 500 mg | 10 mg C | 90% | 60 k | 2 |

We claim:

1. Process for the photocatalytic polymerization of cyclical olefin or at least two different cyclical olefins in the presence of a metal compound as the catalyst, characterize in that a photochemical ring-opening metathesis polyme

25 ization is carried out in the presence of a catalytic amount of at least one heat-stable titanium(IV), niobium(V), tantalum (V), molybdenum(VI) or tungsten(VI) compound in which a silylmethyl group and at least one halogen are bonded to the metal.

2. Process according to claim 1, characterized in that the cyclical olefins are monocyclical rings or polycyclical, bridged or fused ring systems with 2 to 4 rings, which are unsubstituted or substituted and optionally contain one or more heteroatoms from the group consisting of O, S, N and Si in one or more rings and optionally contain fused, aromatic or heteroaromatic rings.

3. Process according to claim 2, characterized in that the cyclical rings contain 3 to 16 ring members.

4. Process according to claim 3, characterized in that the cyclical rings contain 3 to 12 ring members.

5. Process according to claim 2, characterized in that the cyclical olefins contain further non-aromatic double bonds.

6. Process according to claim 1, characterized in that the cycloolefins correspond to the formula I

(I)

in which $Q_1$ is a radical having at least one carbon atom which, together with the —CH=CQ$_2$ group, forms an at least 3-membered alicyclical ring which optionally contains one or more heteroatoms chosen from the group consisting of silicon, phosphorus, oxygen, nitrogen and sulfur; and which is unsubstituted or substituted by halogen, =O, —CN, —NO$_2$, $R_1R_2R_3Si$—(O)$_u$, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{20}$alkyl, $C_1$-$C_{20}$hydroxyalkyl, $C_1$-$C_{20}$haloalkyl, $C_1$-$C_6$cyanoalkyl, $C_3$-$C_8$cycloalkyl, $C_6$-$C_{16}$aryl, $C_7$-$C_{16}$aralkyl, $C_3$-$C_6$heterocycloalkyl, $C_3$-$C_{16}$heteroaryl, $C_4$-$C_{16}$heteroaralkyl or $R_4$—X—; or in which two adjacent C atoms are substituted by —CO—O—CO— or —CO—NR$_5$—CO—; or in which an alicyclical, aromatic or heteroaromatic ring which is unsubstituted or substituted by halogen, —CN, —NO$_2$, $R_6R_7R_8Si$—(O)$_u$, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{20}$alkyl, $C_1$-$C_{20}$haloalkyl, $C_1$-$C_{20}$hydroxyalkyl, $C_1C_6$cyanoalkyl, $C_3$-$C_8$cycloalkyl, $C_6$-$C_{16}$aryl, $C_7$-$C_{16}$aralkyl, $C_3$-$C_6$heterocycloalkyl, $C_3$-$C_{16}$heteroaryl, $C_4$-$C_{16}$heteroaralkyl or $R_{13}$—X$_1$— is optionally fused onto adjacent carbon atoms of the alicyclical ring;

X and X$_1$ independently of one another are —O—, —S—, —CO—, —SO—, —SO$_2$—, —O—C(O)—, —C(O)—O—, —C(O)—NR$_5$—, —NR$_{10}$C(O)—, —SO$_2$—O— or —O—SO$_2$—;

$R_1$, $R_2$ and $R_3$ independently of one another are $C_1$-$C_{12}$alkyl, $C_1$-$C_{12}$perfluoroalkyl, phenyl or benzyl;

$R_4$ and $R_{13}$ independently are $C_1$-$C_{20}$alkyl, $C_1$-$C_{20}$haloalkyl, $C_1$-$C_{20}$hydroxyalkyl, $C_3$-$C_8$cycloalkyl, $C_6$-$C_{16}$aryl or $C_7$-$C_{16}$aralkyl;

$R_5$ and $R_{10}$ independently of one another are hydrogen, $C_1$-$C_{12}$alkyl, phenyl or benzyl, where the alkyl groups in turn are unsubstituted or substituted by $C_1$-$C_{12}$alkoxy or $C_3$-$C_8$cycloalkyl;

$R_6$, $R_7$ and $R_8$ independently of one another are $C_1$-$C_{12}$alkyl, $C_1$-$C_{12}$perfluoroalkyl, phenyl or benzyl;

M is an alkali metal and M$_1$ is an alkaline earth metal; and

26 u is 0 or 1;

where the alicyclical ring formed with $Q_1$ optionally contains further non-aromatic double bonds;

$Q_2$ is hydrogen, $C_1$-$C_{20}$alkyl, $C_1$-$C_{20}$haloalkyl, $C_1$-$C_{12}$alkoxy, halogen, —CN or $R_{11}$—X$_2$—;

$R_{11}$ is $C_1$-$C_{20}$alkyl, $C_1$-$C_{20}$haloalkyl, $C_1$-$C_{20}$hydroxyalkyl, $C_3$-$C_8$cycloalkyl, $C_6$-$C_{16}$aryl or $C_7$-$C_{16}$aralkyl;

$X_2$ is —C(O)—O— or —C(O)—NR$_{12}$;

$R_{12}$ is hydrogen, $C_1$-$C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1$-$C_{12}$alkyl, $C_1$-$C_{12}$alkoxy, —NO$_2$, —CN or halogen, and where the heteroatoms of the abovementioned heterocycloalkyl, heteroaryl and heteroaralkyl groups are chosen from the group consisting of —O—, —S—, —NR$_9$— and —N=; and $R_9$ is hydrogen, $C_1$-$C_{12}$alkyl, phenyl or benzyl.

7. Process according to claim 6, characterized in that the alicyclical ring which $Q_1$ forms together with the —CH=CQ$_2$—groups has 3 to 16 ring atoms, the ring system being a monocyclical, bicyclical, tricyclical or tetracyclical ring system.

8. Process according to claim 6, characterized in that $Q_2$ in formula I is hydrogen.

9. Process according to claim 6, characterized in that in the compounds of the formula I $Q_1$ is a radical with at least one carbon atom which, together with the —CH=CQ$_2$— group, forms a 3- to 20-membered alicyclical ring which optionally contains one or more heteroatoms chosen from the group consisting of silicon, oxygen, nitrogen and sulfur; and which is unsubstituted or substituted by halogen, =O, —CN, —NO$_2$, $R_1R_2R_3Si$—(O)$_u$, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{12}$alkyl, $C_1$-$C_{12}$haloalkyl, $C_1$-$C_{12}$hydroxyalkyl, $C_1$-$C_4$cyanoalkyl, $C_3$-$C_6$cycloalkyl, $C_6$-$C_{12}$aryl, $C_7$-$C_{12}$aralkyl, $C_3$-$C_6$heterocycloalkyl, $C_3$-$C_{12}$heteroaryl, $C_4$-$C_{12}$heteroaralkyl or $R_4$—X—; or in which two adjacent C atoms in this radical $Q_1$ are substituted by —CO—O—CO— or —CO—NR$_5$—CO—; or in which an alicyclical, aromatic or heteroaromatic ring which is unsubstituted or substituted by halogen, —CN, —NO$_2$, $R_6R_7R_8Si$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{12}$alkyl, $C_1$-$C_{12}$haloalkyl, $C_1$-$C_2$hydroxyalkyl, $C_1$-$C_4$cyanoalkyl, $C_3$-$C_6$cycloalkyl, $C_6$-$C_{12}$aryl, $C_7$-$C_{12}$aralkyl, $C_3$-$C_6$heterocycloalkyl, $C_3$-$C_{12}$heteroaryl, $C_4$-$C_{12}$heteroaralkyl or $R_{13}$—X$_1$— is optionally fused onto adjacent carbon atoms;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

$R_1$, $R_2$ and $R_3$ independently of one another are $C_1$-$C_6$alkyl, $C_1$-$C_6$perfluoroalkyl, phenyl or benzyl;

M is an alkali metal and M$_1$ is an alkaline earth metal;

$R_4$ and $R_{13}$ independently of one another are $C_1$-$C_{12}$alkyl, $C_1$-$C_{12}$haloalkyl, $C_1$-$C_{12}$hydroxyalkyl, $C_3$-$C_8$cycloalkyl, $C_6$-$C_{12}$aryl or $C_7$-$C_{12}$aralkyl;

$R_5$ and $R_{10}$ independently of one another are hydrogen, $C_1$-$C_6$alkyl, phenyl or benzyl, where the alkyl groups in turn are unsubstituted or substituted by $C_1$-$C_6$alkoxy or $C_3$-$C_6$cycloalkyl;

$R_6$, $R_7$ and $R_8$ independently of one another are $C_1$-$C_6$alkyl, $C_1$-$C_6$perfluoroalkyl, phenyl or benzyl;

u is 0 or 1;

where the alicyclical ring formed with $Q_1$ optionally contains further non-aromatic double bonds;

$Q_2$ is hydrogen, $C_1$-$C_{12}$alkyl, $C_1$-$C_{12}$haloalkyl, $C_1$-$C_6$alkoxy, halogen, —CN or $R_{11}$—$X_2$—;

$R_{11}$ is $C_1$-$C_{12}$alkyl, $C_1$-$C_{12}$haloalkyl, $C_1$-$C_{12}$hydroxyalkyl, $C_3$-$C_6$cycloalkyl, $C_6$-$C_{12}$aryl or $C_7$-$C_{12}$aralkyl;

$X_2$ is —C(O)—O— or —C(O)—$NR_{12}$; and $R_{12}$ is hydrogen, $C_1$-$C_6$alkyl, phenyl or benzyl;

where the cycloalkyl, heterocycloalkyl, aryl, heteroaryl, aralkyl and heteroaralkyl groups are unsubstituted or substituted by $C_1$-$C_6$alkyl, $C_1$-$C_6$alkoxy, —$NO_2$, —CN or halogen, and where the heteroatoms of the heterocycloalkyl, heteroaryl and heteroaralkyl groups are chosen from the group consisting of —O—, —S—, —$NR_9$— and —N=; and $R_9$ is hydrogen, $C_1$-$C_6$alkyl, phenyl or benzyl.

10. Process according to claim 6, characterized in that in the compounds of the formula I $Q_1$ is a radical with at least one carbon atom which, together with the —CH=$CQ_2$— group, forms a 3- to 10-membered alicyclical ring which optionally contains a heteroatom chosen from the group consisting of silicon, oxygen, nitrogen and sulfur and is unsubstituted or substituted by halogen, —CN, —$NO_2$, $R_1R_2R_3Si$—, —COOM, —$SO_3M$, —$PO_3M$, —COO$(M_1)_{1/2}$, —$SO_3(M_1)_{1/2}$, —$PO_3(M_1)_{1/2}$, $C_1$-$C_6$alkyl, $C_1$-$C_6$haloalkyl, $C_1$-$C_6$hydroxyalkyl, $C_1$-$C_4$cyanoalkyl, $C_3$-$C_6$cycloalkyl, phenyl, benzyl or $R_4$—X—; or in which an alicyclical, aromatic or heteroaromatic ring which is unsubstituted or substituted by halogen, —CN, —$NO_2$, $R_6R_7R_8Si$—, —COOM, —$SO_3M$, —$PO_3M$, —COO$(M_1)_{1/2}$, —$SO_3(M_1)_{1/2}$, —$PO_3(M_1)_{1/2}$, $C_1$-$C_6$alkyl, $C_1$-$C_6$haloalkyl, $C_1$-$C_6$hydroxyalkyl, $C_1$-$C_4$cyanoalkyl, $C_3$-$C_6$cycloalkyl, phenyl, benzyl or $R_{13}$—$X_1$— is optionally fused onto adjacent carbon atoms;

$R_1$, $R_2$ and $R_3$ independently of one another are $C_1$-$C_4$alkyl, $C_1$-$C_4$perfluoroalkyl, phenyl or benzyl;

M is an alkali metal and $M_1$ is an alkaline earth metal;

$R_4$ and $R_{13}$ independently of one another are $C_1$-$C_6$alkyl, $C_1$-$C_6$haloalkyl, $C_1$-$C_6$hydroxyalkyl or $C_3$-$C_6$cycloalkyl;

X and $X_1$ independently of one another are —O—, —S—, —CO—, —SO— or —$SO_2$—;

$R_6$, $R_7$ and $R_8$ independently of one another are $C_1$-$C_4$alkyl, $C_1$-$C_4$perfluoroalkyl, phenyl or benzyl; and $Q_2$ is hydrogen.

11. Process according to claim 1, characterized in that the cyclical olefins are norbornene or norbornene derivatives.

12. Process according to claim 11, characterized in that the norbornene derivatives are those of the formula II

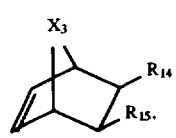

(II)

in which $X_3$ is —$CHR_{16}$—, oxygen or sulfur;

$R_{14}$ and $R_{15}$ independently of one another are hydrogen, —CN, trifluoromethyl, $(CH_3)_3Si$—O—, $(CH_3)_3Si$— or —$COOR_{17}$; and $R_{16}$ and $R_{17}$ independently of one another are hydrogen, $C_1$-$C_{12}$-alkyl, phenyl or benzyl;

or those of the formula III

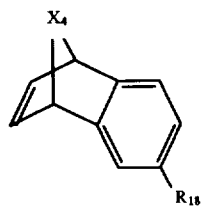

(III)

in which $X_4$ is —$CHR_{19}$—, oxygen or sulfur;

$R_{19}$ is hydrogen, $C_1$-$C_{12}$alkyl, phenyl or benzyl; and $R_{18}$ is hydrogen, $C_1$-$C_6$alkyl or halogen;

or those of the formula IV

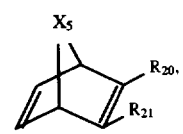

(IV)

in which $X_5$ is —$CHR_{22}$—, oxygen or sulfur;

$R_{22}$ is hydrogen, $C_1$-$C_{12}$alkyl, phenyl or benzyl;

$R_{20}$ and $R_{21}$ independently of one another are hydrogen, CN, trifluoromethyl, $(CH_3)_3Si$—O—, $(CH_3)_3Si$— or —$COOR_{23}$; and $R_{23}$ is hydrogen, $C_1$-$C_{12}$alkyl, phenyl or benzyl;

or those of the formula V

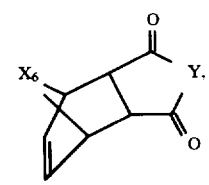

(V)

in which $X_6$ is —$CHR_{24}$—, oxygen or sulfur;

$R_{24}$ is hydrogen, $C_1$-$C_{12}$alkyl, phenyl or benzyl;

Y is oxygen or

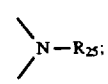

and $R_{25}$ is hydrogen, methyl, ethyl or phenyl.

13. Process according to claim 1, characterized in that th halogen bonded to the metal atom is F, Cl, Br or I.

14. Process according to claim 1, characterized in that th silylmethyl group corresponds to the formula VII

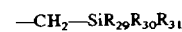

(VI)

in which $R_{29}$, $R_{30}$ and $R_{31}$ independently of one anothe are $C_1$-$C_{18}$alkyl, $C_5$- or $C_6$cycloalkyl, or phenyl benzyl which are unsubstituted or substituted $C_1$-$C_6$alkyl or $C_1$-$C_6$alkoxy.

15. Process according to claim 14, characterized in that the group of the formula VII, $R_{29}$ to $R_{31}$ are $C_1$-$C_4$alk phenyl or benzyl.

16. Process according to claim 14, characterized in that the group of the formula VII consists —$CH_2$—$Si(CH_3)_3$, —$CH_2$—$Si(C_2H_5)_3$, —$CH_2$—$Si(n-C_3H_7)_3$, —$CH_2$—$Si(CH_3)_2(C_2H_5)$, —$CH_2$—$Si(CH_3)_2[C(CH_3)_2CH(CH_3)_2]$, —$CH_2$—$Si(CH_3)_2(n-C_4H_9)$, —$CH_2$—$Si(CH_3)_2(t-C_4H_9)$, —$CH_2$—$Si(CH_3)_2(n-C_{18}H_{37})$, —$CH_2$—$Si(C_6H_5)_3$, —$CH_2$—$Si(CH_2$—$C_6H_5)_3$, —$CH_2$—$Si(C_6$—$H_5)(CH_3)_2$, —$CH_2$—$Si(n-C_4H_9)_3$, —$CH_2$—$Si(CH_3)_2$ (n-$C_{12}H_{25}$) and —$CH_2$—$Si(CH_2$—$C_6H_5)(CH_3)_2$.

17. Process according to claim 14, characterized in that the group of the formula VII is —$CH_2$—$Si(CH_3)_3$.

18. Process according to claim 1, characterized in that the other valencies of the Ti(IV), Nb(V), Ta(V), Mo(VI) and W(VI) atoms are satisfied by identical or different neutral ligands from the group consisting of =O, =N—$R_{33}$, secondary amines having 2 to 18 C atoms, $R_{32}$O—, $R_{32}$S—, halogen, optionally substituted cyclopentadienyl, bridged biscyclopentadienyl, tridentate monoanionic ligands and neutral ligands, in which the $R_{32}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl or halogen; and $R_{33}$ is linear or branched $C_1$–$C_{18}$alkyl which is unsubstituted or substituted by $C_1$–$C_6$alkoxy, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl or halogen, with the proviso that in the case of the titanium compounds, the ligand is not =O or =N—$R_{33}$.

19. Process according to claim 1, characterized in that the metal compounds correspond to the formulae VIII, VIIIa and VIIIb

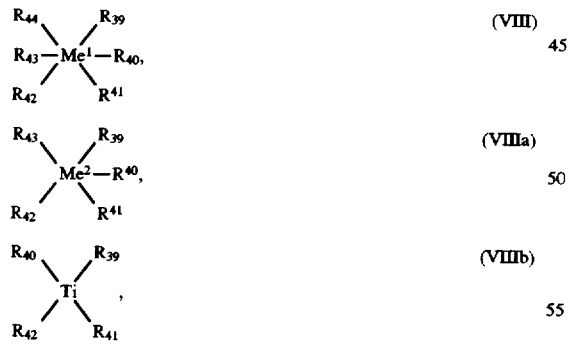

in which $Me_1$ is Mo(VI) or W(VI);
$Me_2$ is Nb(V) or Ta(V);
one of the radicals $R_{39}$ to $R_{44}$ is a radical —$CH_2SiR_{29}R_{30}R_{31}$ of the formula VII;
at least one of the radicals $R_{39}$ to $R_{44}$ is F, Cl or Br;
$R_{29}$, $R_{30}$ and $R_{31}$ independently of one another are $C_1$–$C_6$alkyl, $C_5$- or $C_6$cycloalkyl, or phenyl or benzyl which are unsubstituted or substituted by $C_1$–$C_6$alkyl or $C_1$–$C_6$alkoxy;

in formula VIII two or in each case two and in formula VIIIa two of the other radicals of $R_{39}$ to $R_{44}$ each together are =O or =N—$R_{33}$, and $R_{33}$ is linear or branched $C_1$–$C_{18}$alkyl which is unsubstituted or substituted by $C_1$–$C_6$alkoxy, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, and the other radicals $R_{39}$ to $R_{43}$ are secondary amino having 2 to 18 C atoms, $R_{32}$O— or $R_{32}$S—, halogen, unsubstituted or substituted cyclopentadienyl or bridged biscyclopentadienyl or a neutral ligand, in which the $R_{32}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen; or in the formulae VIII, VIIIa and VIIIb the other radicals of $R_{39}$ to $R_{44}$ independently of one another are secondary amino having 2 to 18 C atoms, $R_{32}$O— or $R_{32}$S—, halogen, unsubstituted or substituted cyclopentadienyl or bridged biscyclopentadienyl or a neutral ligand in which the $R_{32}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen.

20. Process according to claim 1, characterized in that titanium, niobium, tantalum, molybdenum or tungsten compounds of the formulae VIII, VIIIa and VIIIb in which $R_{39}$ is a radical of the formula VII —$CH_2Si(R_{29}R_{30}R_{31})_3$.
$R_{40}$ is F, Cl or Br; and (a) in formula VIII $R_{41}$ and $R_{42}$, and $R_{43}$ and $R_{44}$, in each case together, are the radical =N—$R_{33}$, or $R_{41}$ and $R_{42}$ together are the radical =N—$R_{33}$ and $R_{43}$ and $R_{44}$ independently of one another are unsubstituted or substituted cyclopentadienyl, $R_{32}$—O— or halogen, or (b) in formula VIIIa $R_{41}$ and $R_{42}$ together are the radical =N—$R_{33}$, and $R_{43}$ is unsubstituted or substituted cyclopentadienyl, $R_{32}$—O— or halogen, or in formula VIIIa $R_{41}$, $R_{42}$ and $R_{43}$ independently of one another are unsubstituted or substituted cyclopentadienyl, $R_{32}$—O— or halogen, or (c) in formula VIIIb $R_{41}$ and $R_{42}$ independently of one another are unsubstituted or substituted cyclopentadienyl, $R_{32}$—O— or halogen, where $R_{29}$, $R_{30}$, $R_{31}$, $R_{32}$ and $R_{33}$ have the meanings given in claim 19, are used.

21. Process according to claim 1, characterized in that metal compounds of the formulae IX, IXa, IXb, IXc or IXd

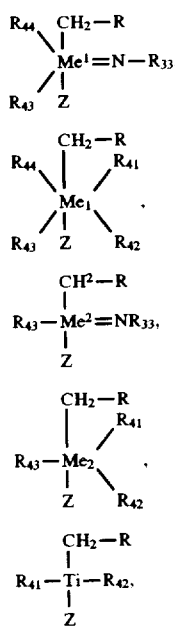

in which
Me₁ is Mo(VI) or W(VI);
Me₂ is Nb(V) or Ta(V);
R is —Si(C₁-C₄alkyl)₃;
Z is Cl or Br;
R₃₃ is phenyl or phenyl which is substituted by 1 to 3 C₁-C₄alkyl or C₁-C₄alkoxy, (a) R₄₃ and R₄₄ in formula IX together are the group =NR₃₃ or individually independently of one another are F, Cl, Br, linear or, in particular, branched C₁-C₄alkoxy which is unsubstituted or substituted by fluorine, phenyloxy which is unsubstituted or substituted by C₁-C₄alkyl or C₁-C₄alkoxy, or cyclopentadienyl which is unsubstituted or substituted by C₁-C₄alkyl;

(b) R₄₁, R₄₂ and R₄₃ and R₄₄ in formula IXa independently of one another are F, Cl, Br, linear or, in particular, branched C₁-C₄alkoxy which is unsubstituted or substituted by fluorine, phenyloxy which is unsubstituted or substituted by C₁-C₄alkyl or C₁-C₄alkoxy, or cyclopentadienyl which is unsubstituted or substituted by C₁-C₄alkyl;

(c) R₄₃ in formula IXb is F, Cl, Br, linear or, in particular, branched C₁-C₄alkoxy which is unsubstituted or substituted by fluorine, phenyloxy which is unsubstituted or substituted by C₁-C₄alkyl or C₁-C₄alkoxy, or cyclopentadienyl which is unsubstituted or substituted by C₁-C₄alkyl;

(d) R₄₁, R₄₂ and R₄₃ in formula IXc independently of one another are F, Cl, Br, linear or, in particular, branched C₁-C₄alkoxy which is unsubstituted or substituted by fluorine, phenyloxy which is unsubstituted or substituted by C₁-C₄alkyl or C₁-C₄alkoxy, or cyclopentadienyl which is unsubstituted or substituted by C₁-C₄alkyl; and (e) R₄₁ and R₄₂ in formula IXd independently of one another are F, Cl, Br, linear or, in particular, branched C₁-C₄alkoxy which is unsubstituted or substituted by fluorine, phenyloxy which is unsubstituted or substituted by C₁-C₄alkyl or C₁-C₄alkoxy, or cyclopentadienyl which is unsubstituted or substituted by C₁-C₄alkyl, are used.

22. Process according to claim 21, characterized in that titanium, niobium, tantalum, molybdenum or tungsten compounds of the formulae X, Xa, Xb, Xc and Xd

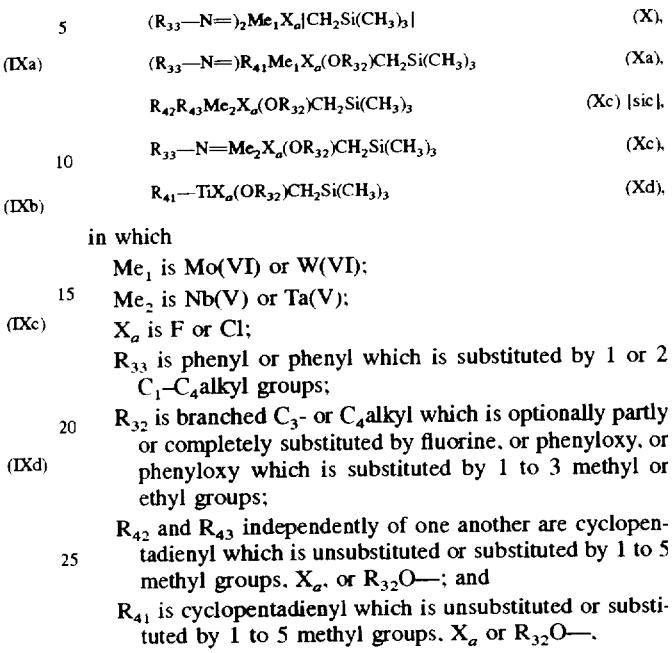

in which
Me₁ is Mo(VI) or W(VI);
Me₂ is Nb(V) or Ta(V);
Xₐ is F or Cl;
R₃₃ is phenyl or phenyl which is substituted by 1 or 2 C₁-C₄alkyl groups;
R₃₂ is branched C₃- or C₄alkyl which is optionally partly or completely substituted by fluorine, or phenyloxy, or phenyloxy which is substituted by 1 to 3 methyl or ethyl groups;
R₄₂ and R₄₃ independently of one another are cyclopentadienyl which is unsubstituted or substituted by 1 to 5 methyl groups, Xₐ, or R₃₂O—; and
R₄₁ is cyclopentadienyl which is unsubstituted or substituted by 1 to 5 methyl groups, Xₐ or R₃₂O—,
are used.

23. Process according to claim 1, characterized in that titanium(IV), niobium(V), tantalum(V), molybdenum(VI) or tungsten(VI) compounds of the formula Ti|CH₂Si(CH₃)₃|Cl₃, Me(=N-2,6-dimethylC₆H₃)(2,6-dimethyl-C₆H₅O)|CH₂Si(CH₃)₃|Cl, Ti|CH₂Si(CH₃)₃ Br₃, Mo(=N-2,6-diisopropylC₆H₃)|(OCH₂C(CH₃)₃|; |CH₂—Si(CH₃)₃|Cl, Cp₂Ti|CH₂Si(CH₃)₃|Cl, Me(=N-2 6-diisopropylC₆H₃)|(CH₃)₂CHO||(CH₂Si(CH₃)₃|Cl (CH₃)₂Ti|CH₂Si(CH₃)₃|Cl, Cp₂Me|(CH₂Si(CH₃)₃|Cl₂ Cp₂Me|OC(CH₃)₃||(CH₂Si(CH₃)₃|Cl, Cp₂Ti|CH₂S (CH₃)₃|Br, Cp₂Ti|CH₂Si(CH₃)₃|I, Mo(=N—C₆H₅) |CH₂—Si(CH₃)₃|Cl, CpTi|CH₂Si(CH₃)₃||CH₃|Cl Me(=N-2,6-diisopropylC₆H₃)|(CH₂Si(CH₃)₃|Cl₂, CpT |CH₂Si(CH₃)₃|Br₂, CpMe|OCH (CH₃)₂|₂|(CH₂S (CH₃)₃|Cl, (C₆H₅O)CpTi|CH₂Si(CH₃)₃|Cl, |(CH₃) CHO|₂Ti|CH₂Si(CH₃)₃|Cl, Mo(=N-2,6 diisopropylC₆H₃)₂|CH₂—Si(CH₃)₃|Cl, |(CF₃)₂CHO|₂T |CH₂Si(CH₃)₃|Cl, (2,6-dimethyl-C₆H₅O)₂Ti|CH₂S (CH₃)₃|Cl, |(CF₃)₂CHO|CpTi|CH₂Si(CH₃)₃|Cl, (2,6 dimethyl-C₆H₅O)Ti|CH₂Si(CH₃)₃|₂Br, |(CH₃)₂CHO CpTi|CH₂Si(CH₃)₃|Cl, Me(=N—C₆H₅)|OCH(CH₃)₂| (CH₂Si(CH₃)₃|Cl, (2,6-dimethyl-C₆H₅O)CpTi|CH₂S (CH₃)₃|Cl, CpMe|OC(CH₃)(CF₃)₂|₂|(CH₂Si(CH₃)₃|C |(CH₃)₃CO|CpTi|CH₂Si(CH₃)₃|Cl, W(=N—C₆H₅)|(O (CH₃)₃||CH₂—Si(CH₃)₃|Cl₂, |(CF₃)₂(CH₃)CO|CpT |CH₂Si(CH₃)₃|Cl, (=N-2,6-dimethylC₆H₃)CpMe (CH₂Si(CH₃)₃|Cl, Me(=N—C₆H₅)|OCH(CF₃)₂ (CH₂Si(CH₃)₃|Cl, CpMe|OCH(CH₃)₂|₂|(CH₂Si(CH₃) Br, Me(=N-2,6-dimethylC₆H₃)((CF₃)₂CHO)|CH₂ (CH₃)₃|Cl, |OCH(CH₃)₂|₂Me|CH₂Si(CH₃)₃|Cl (C₆H₅O)₂CpMe|(CH₂Si(CH₃)₃|Cl, Me(2,6 dimethylphenyloxy)(CH₃O)₂|(CH₂Si(CH₃)₃|Cl, Cp₂M (methyl)|(CH₂Si(CH₃)₃|Cl, Me|CH₂Si(CH₃)₃||OC (CH₃)|(CF₃O)₂Cl, (2,6-diisopropylphenyloxy)₂M |CH₂Si(CH₃)₃|Cl₂, CpMe|OCH(CF₃)₂|₂|(CH₂Si(CH₃) Cl, Cp₂Me|OCH(CH₃)₂||(CH₂Si(CH₃)₃|Cl, W(=N- C₆H₅|(OC(CH₃)₃|₂|CH₂—Si(CH₃)₃|Cl, Mo₂|(CH₂— (CH₃)₃)(OCH₂C(CH₃)₃)Cl|₂, or (=N-3, dimethyl$C_6H_3$)Me|2,6-dimethyl$C_6H_3$O)]|(CH$_2$Si (CH$_3$)$_3$)|Cl. in which Cp is cyclopentadienyl and Me is Nb(V) or Ta(V)) |sic| are used.

24. Process according to claim 1, characterized in that the titanium(IV), niobium(V), tantalum(V), molybdenum(VI) and tungsten(VI) compounds are employed in an amount of 0.001 to 20 mol %, based on the amount of the cycloolefin.

25. Process for photocatalytically induced and subsequent thermal polymerization of a cyclical olefin or at least two different cyclical olefins in the presence of a metal compound as the catalyst according to claim 1, characterized in that a) the cycloolefins are first irradiated in the presence of a catalytic amount of at least one heat-stable titanium (IV), niobium(V), tantalum(V), molybdenum(VI) or tungsten(VI) compound in which a silylmethyl group and at least one halogen is |sic| bonded to the metal; or a catalytic amount of a heat-stable titanium(IV), niobium(V) or tantalum(V) compound in which a silylmethyl group and at least one halogen is |sic| bonded to the metal is irradiated, if appropriate in an inert solvent, and then mixed with at least one cycloolefin; and (b) the polymerization is then ended by heating and without irradiation.

26. Composition comprising (a) a cyclical olefin or at least two different cyclical olefins and (b) a catalytically active amount of at least one heat-stable titanium(IV), niobium(V), tantalum(V), molybdenum (VI) or tungsten(VI) compound in which a silylmethyl group and at least one halogen are bonded to the metal.

27. Coated carrier material, characterized in that a (a) a cyclical olefin or at least two different cyclical olefins and (b) a catalytically active amount of at least one heat-stable titanium(IV), niobium(V), tantalum(V), molybdenum (VI) or tungsten(VI) compound in which a silylmethyl group and at least one halogen is |sic| bonded to the metal is applied to a carrier.

28. Carrier material which is coated with an oligomer or polymer prepared according to claim 1 and comprises a crosslinking agent.

29. Coated carrier material, characterized in that a layer of a polymer prepared according to claim 1 is applied to a carrier.

30. Process for the production of coated materials or images in relief on carriers, in which a composition according to claim 26 is applied, the solvent is removed, if appropriate, and the layer is irradiated for polymerization and, if appropriate, after-cured by means of heat, or the layer is irradiated through a photomask and after-cured by means of heat, if appropriate, and the non-irradiated portions are then removed with a solvent.

* * * * *

UNITED STATES PATENT AND TRADEMARK OFFICE
CERTIFICATE OF CORRECTION

PATENT NO. : 5,776,997
DATED : JULY 7, 1998
INVENTOR(S) : ANDREAS HAFNER ET AL.

It is certified that error appears in the above-identified patent and that said Letters Patent is hereby corrected as shown below:

Title page, left column, section [22] should read:

-- PCT Filed: Nov. 6, 1995 --.

Signed and Sealed this

Twenty-fourth Day of November, 1998

Attest:

BRUCE LEHMAN

*Attesting Officer*      *Commissioner of Patents and Trademarks*